(12) United States Patent
Lee et al.

(10) Patent No.: US 11,196,304 B2
(45) Date of Patent: Dec. 7, 2021

(54) ELECTRONIC DEVICE AND METHOD FOR CONTROLLING MULTI-WIRELESS CHARGING

(71) Applicant: Samsung Electronics Co., Ltd., Gyeonggi-do (KR)

(72) Inventors: Jangwoo Lee, Gyeonggi-do (KR); Taeseon Kim, Gyeonggi-do (KR); Taeho Wang, Gyeonggi-do (KR); Soonkyu Jang, Gyeonggi-do (KR); Sunmi Jin, Gyeonggi-do (KR); Jihoon Ha, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

(21) Appl. No.: 16/564,086

(22) Filed: Sep. 9, 2019

(65) Prior Publication Data
US 2020/0091779 A1 Mar. 19, 2020

(30) Foreign Application Priority Data
Sep. 19, 2018 (KR) .......................... 10-2018-0112474

(51) Int. Cl.
*H02J 50/80* (2016.01)
*H04B 5/00* (2006.01)
(Continued)

(52) U.S. Cl.
CPC .............. *H02J 50/80* (2016.02); *H02J 7/025* (2013.01); *H02J 50/10* (2016.02); *H02J 50/40* (2016.02);
(Continued)

(58) Field of Classification Search
CPC .. H02J 50/80; H02J 7/025; H02J 50/40; H02J 50/10; H02J 7/007; H02J 50/402;
(Continued)

(56) References Cited

U.S. PATENT DOCUMENTS 8,476,788 B2 * 7/2013 Karalis .................. B60L 53/51
307/104
2009/0163247 A1 6/2009 Song
(Continued)

FOREIGN PATENT DOCUMENTS

| CN | 105391184 A | * | 3/2016 | .............. H02J 50/10 |
| KR | 10-2012-0049588 A | | 5/2012 | |
| KR | 10-2012-0107391 A | | 10/2012 | |

OTHER PUBLICATIONS

International Search Report dated Dec. 13, 2019.

*Primary Examiner* — Stacy Whitmore
(74) *Attorney, Agent, or Firm* — Cha & Reiter, LLC

(57) ABSTRACT

According to certain embodiments, an electronic device comprises a plurality of coils configured to transmit charging power; a communication circuit; at least one processor; and at least one memory. The at least one memory stores instructions that, when executed by the at least one processor, causes the at least one processor to perform a plurality of operations. The plurality of operations comprises transmitting a first signal for requesting device-related information to a plurality of external electronic devices through the communication circuit, receiving a corresponding plurality of first response signals in response to the first signal from the plurality of external electronic devices through the communication circuit, selecting at least one external electronic device from among the plurality of external electronic devices on the basis of the plurality of first response signals, and upon selecting the at least one selected external electronic device, transmitting a second signal that indicates the at least one selected external electronic device and comprises at least information associated with the plurality of external electronic devices to the plurality of external electronic devices via the communication circuit.

20 Claims, 12 Drawing Sheets

(51) Int. Cl.
*H02J 50/40* (2016.01)
*H02J 50/10* (2016.01)
*H02J 7/02* (2016.01)

(52) U.S. Cl.
CPC ......... *H04B 5/0037* (2013.01); *H04B 5/0087* (2013.01)

(58) Field of Classification Search
CPC .. H02J 50/005; H02J 2310/22; H04B 5/0087; H04B 5/0037; H04W 4/80; H04M 2001/0204
See application file for complete search history.

(56) References Cited

U.S. PATENT DOCUMENTS

| | | | |
|---|---|---|---|
| 2012/0115549 A1 | 5/2012 | Kim et al. | |
| 2015/0054347 A1* | 2/2015 | Amano | H04B 5/0037 307/104 |
| 2015/0130623 A1 | 5/2015 | Robison | |
| 2015/0296322 A1* | 10/2015 | Won | H04W 4/70 455/418 |
| 2015/0382321 A1 | 12/2015 | Ryu et al. | |
| 2017/0033587 A1* | 2/2017 | Hong | H02J 50/80 |
| 2017/0133881 A1 | 5/2017 | Cho et al. | |
| 2019/0386505 A1* | 12/2019 | Lin | H02J 50/40 |
| 2020/0252886 A1* | 8/2020 | Park | H04B 5/0037 |

\* cited by examiner

ELECTRONIC DEVICE AND METHOD FOR CONTROLLING MULTI-WIRELESS CHARGING

CROSS-REFERENCE TO RELATED APPLICATION(S)

This application is based on and claims priority under 35 U.S.C. 119 to Korean Patent Application No. 10-2018-0112474, filed on Sep. 19, 2018, in the Korean Intellectual Property Office, the disclosure of which is herein incorporated by reference in its entirety.

TECHNICAL FIELD

Certain embodiments relate to an electronic device and a method for controlling multi-wireless charging.

BACKGROUND

As electronic device are getting smaller and more portable, it becomes important to have a battery that can be conveniently charged. Charging the battery can entail connecting the battery to a power outlet with a chord. This can be inconvenient to the user.

The above information is presented as background information only to assist with an understanding of the disclosure. No determination has been made, and no assertion is made, as to whether any of the above might be applicable as prior art with regard to the disclosure.

SUMMARY

According to certain embodiments, an electronic device comprises a plurality of coils configured to transmit charging power; a communication circuit; at least one processor; and at least one memory. The at least one memory stores instructions that, when executed by the at least one processor causes the at least one processor to perform a plurality of operations. The plurality of operations comprises transmitting a first signal for requesting device-related information to a plurality of external electronic devices through the communication circuit, receiving a corresponding plurality of first response signals in response to the first signal from the plurality of external electronic devices through the communication circuit, selecting at least one external electronic device from among the plurality of external electronic devices on the basis of the plurality of first response signals, and upon selecting the at least one selected external electronic device, transmitting a second signal that indicates the at least one selected external electronic device and comprises at least information associated with the plurality of external electronic devices to the plurality of external electronic devices via the communication circuit.

According to certain embodiments, an electronic device comprises at least one coil configured to receive charging power, a communication circuit, at least one processor, and at least one memory. The at least one memory stores instructions that, when executed by the at least one processor, causes the at least one processor to perform a plurality of operations. The plurality of operations comprises transmitting a first response signal in response to a first signal to a first external electronic device upon receiving the first signal for requesting device-related information from the first external electronic device comprising a plurality of coils through the communication circuit, receiving a second signal that indicates at least one second external electronic device selected from among a plurality of second external electronic devices and comprises at least information associated with the plurality of external electronic devices from the first external electronic device through the communication circuit, and performing a designated operation on the basis of the received second signal.

According to certain embodiments, a non-transitory storage medium stores instructions, the instructions being configured to enable at least one circuit to perform at least one operation when executed by the at least one circuit. The at least one operation comprises transmitting a first signal for requesting device-related information to a plurality of external electronic devices, receiving a corresponding a plurality of first response signals in response to the first signal from the plurality of external electronic devices, selecting at least one external electronic device from among the plurality of external electronic devices on the basis of the plurality of first response signals, and upon selecting the at least one selected external electronic device, transmitting a second signal that indicates the at least one selected external electronic device and comprises at least information associated with the plurality of external electronic devices to the plurality of external electronic devices.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

Figure 1:
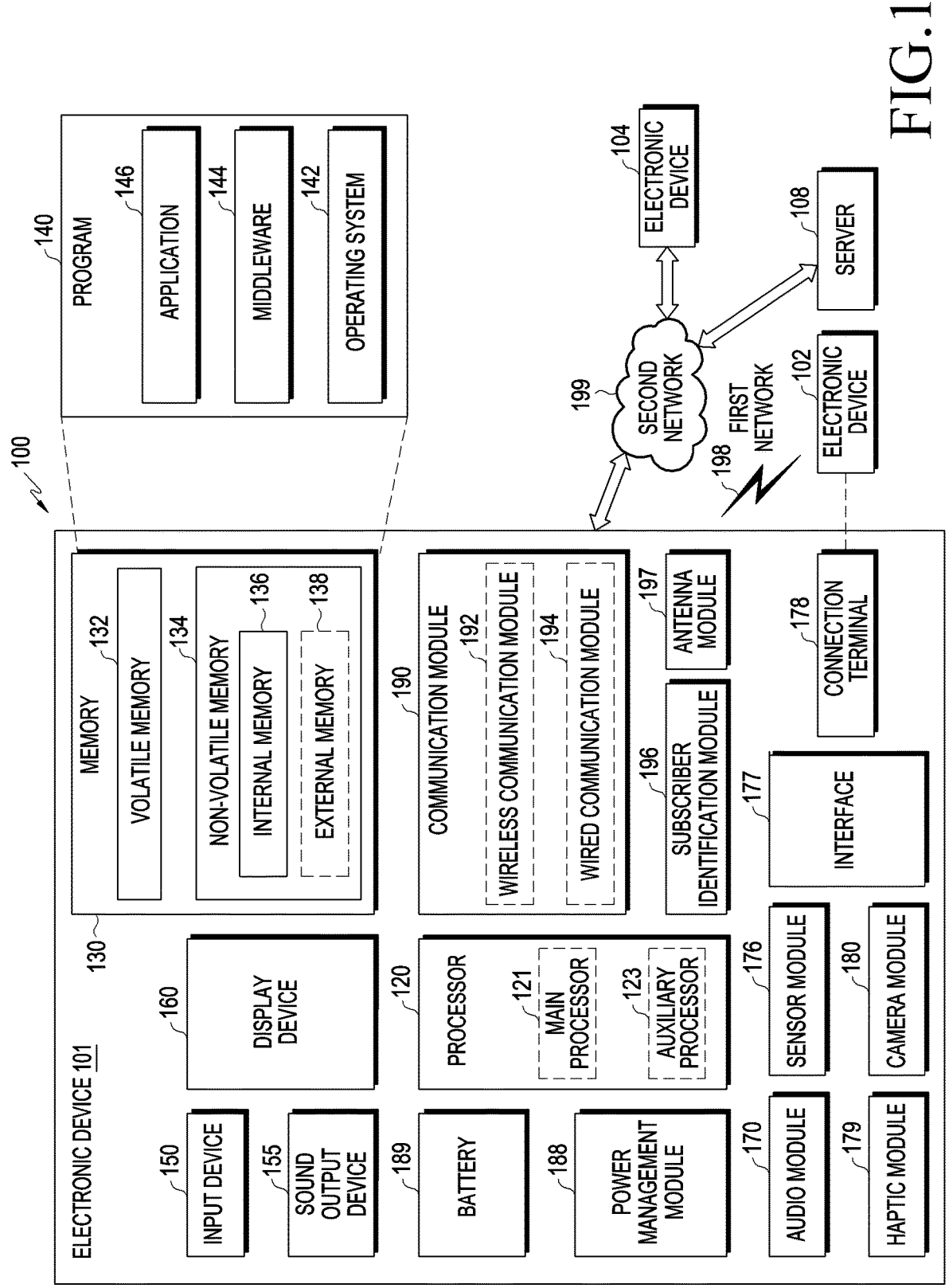
FIG. 1 is a block diagram illustrating an electronic device in a network environment according to certain embodiments.

FIG. 1 is a block diagram illustrating an electronic device 101 in a network environment 100 according to certain embodiments. Referring to FIG. 1, in the network environment 100, the electronic device 101 may communicate with an electronic device 102 via a first network 198 (e.g., a short-range wireless communication network) or may communicate with an electronic device 104 or a server 108 via a second network 199 (e.g., a long-range wireless communication network). According to one embodiment, the electronic device 101 may communicate with the electronic device 104 via the server 108. According to one embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identity module 196, or an antenna module 197. In some embodiments, at least one (e.g., the display device 160 or the camera module 180) of these components may be omitted, or one or more other components may be further included in the electronic device 101. In some embodiments, some of these components may be configured as an integrated circuit. For example, the sensor module 176 (e.g., a fingerprint sensor, an iris sensor, or an illumination sensor) may be embedded in the display device 160 (e.g., a display).

The processor 120 may run, for example, software (e.g., a program 140) to control at least one other component (e.g., a hardware or software component) of the electronic device 101 connected to the processor 120, and may perform various types of data processing or arithmetic operations. According to one embodiment, as at least part of the data processing or operations, the processor 120 may load a command or data received from another component (e.g., the sensor module 176 or the communication module 190) into a volatile memory 132, may process the command or data stored in the volatile memory 132, and may store the resulting data in a nonvolatile memory 134. According to one embodiment, the processor 120 may include a main processor 121 (e.g., a central processing unit or an application processor) and a coprocessor 123 (e.g., a graphics processing unit, an image signal processor, a sensor hub processor, or a communications processor) that is operable independently of or together with the main processor 121. Additionally or alternatively, the coprocessor 123 may be configured to use lower power than the main processor 121 or to specialize in a designated function. The coprocessor 123 may operate separately from the main processor 121 or as a part thereof.

The coprocessor 123 may control at least some of the functions or states associated with at least one component (e.g., the display device 160, the sensor module 176, or the communication module 190) among the components of the electronic device 101, for example, instead of the main processor 121 when the main processor 121 is in an inactive (e.g., sleep) state or along with the main processor 121 when the main processor 121 is in an active (e.g., application-running) state. According to one embodiment, the coprocessor 123 (e.g., an image signal processor or a communications processor) may be configured as a part of another functionally related component (e.g., the camera module 180 or the communication module 190).

The memory 130 may store various data used by at least one component (e.g., the processor 120 or the sensor module 176) of the electronic device 101. The data may include, for example, software (e.g., the program 140), and input data or output data about a command associated with the software. The memory 130 may include a volatile memory 132 or a nonvolatile memory 134.

The program 140 may be stored as software in the memory 130 and may include, for example, an operating system 142, middleware 144, or an application 146.

The input device 150 may receive a command or data to be used for a component (e.g., the processor 120) of the electronic device 101 from the outside (e.g., a user) of the electronic device 101. The input device 150 may include, for example, a microphone, a mouse, a keyboard, or a digital pen (e.g., a stylus pen).

The sound output device 155 may output a sound signal to the outside of the electronic device 101. The sound output device 155 may include, for example, a speaker or a receiver. The speaker may be employed for general use, such as for multimedia playback or recording playback, and the receiver may be used for receiving an incoming call. According to one embodiment, the receiver may be configured separately from the speaker or as a part of the speaker.

The display device 160 may visually provide information to the outside (e.g., a user) of the electronic device 101. The display device 160 may include, for example, a display, a hologram device, or a projector and a control circuit for controlling a corresponding device. According to one embodiment, the display device 160 may include touch circuitry configured to detect a touch or sensor circuitry (e.g., a pressure sensor) configured to measure the strength of force generated by a touch.

The audio module 170 may convert a sound into an electrical signal, or, conversely, an electrical signal into a sound. According to one embodiment, the audio module 170 may acquire a sound through the input device 150 or may output a sound through the audio output device 155 or an external electronic device (e.g., the electronic device 102 (e.g., a speaker or a headphone)) connected directly or wirelessly to the electronic device 101.

The sensor module 176 may detect an operating state (e.g., power or temperature) of the electronic device 101 or an external environmental condition (e.g., a user's condition) and may generate an electrical signal or a data value corresponding to the detected state or condition. According to one embodiment, the sensor module 176 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 177 may support one or more designated protocols that can be used for the electronic device 101 to be directly or wirelessly connected to an external electronic device (e.g., the electronic device 102). According to one embodiment, the interface 177 may include, for example, a High-Definition Multimedia Interface (HDMI), a Universal Serial Bus (USB) interface, an SD card interface, or an audio interface.

A connection terminal 178 may include a connector through which the electronic device 101 can be physically connected to an external electronic device (e.g., the electronic device 102). According to one embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., vibrations or a movement) or an electrical stimulus that is perceivable by the user through a tactile sensation or the sense of movement. According to one embodiment, the haptic module 179 may include, for example, a motor, a piezoelectric element, or an electrical stimulation device.

The camera module 180 may capture a still image and a moving image. According to one embodiment, the camera module 180 may include one or more lenses, image sensors, image signal processors, or flashes.

The power management module 188 may manage the power supplied to the electronic device 101. According to one embodiment, the power management module 188 may be configured, for example, as at least a part of a Power Management Integrated Circuit (PMIC).

The battery 189 may supply power to at least one component of the electronic device 101. According to one embodiment, the battery 189 may include, for example, a non-rechargeable primary battery, a rechargeable secondary battery, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication through the established communication channel. The communication module 190 may include one or more communication processors that operate independently of the processor 120 (e.g., an application processor) and support direct (e.g., wired) communication or wireless communication. According to one embodiment, the communication module 190 may include a wireless communication module 192 (e.g., a cellular communication module, a short-range wireless communication module, or a Global Navigation Satellite System (GNSS) communication module) or a wired communication module 194 (e.g., a Local Area Network (LAN) communication module or a power-line communication module). Among these communication modules, a corresponding communication module may communicate with an external electronic device via the first network 198 (e.g., a short-range communication network including a Bluetooth, Wi-Fi direct, or Infrared Data Association (IrDA) network) or the second network 199 (e.g., a long-range communication network including a cellular network, the Internet, or a computer network (e.g., a LAN or WAN)). These various types of communication modules may be integrated into one component (e.g., a single chip) or may be configured as a plurality of separate components (e.g., a plurality of chips). The wireless communication module 192 may identify and authenticate the electronic device 101 within a communication network, such as the first network 198 or the second network 199, using subscriber information (e.g., an International Mobile Subscriber Identity (IMSI)) stored in the subscriber identity module 196.

The antenna module 197 may transmit a signal or power to the outside (e.g., an external electronic device) or may receive a signal or power from the outside. According to one embodiment, the antenna module 197 may include one antenna including a radiator of a conductor or a conductive pattern, which is formed on a substrate (e.g., a PCB). According to one embodiment, the antenna module 197 may include a plurality of antennas. In this case, at least one antenna suitable for a communication mode used for a communication network, such as the first network 198 or the second network 199, may be selected, for example, by the communication module 190, from among the plurality of antennas. A signal or power may be transmitted or received between the communication module 190 and an external electronic device via the at least one selected antenna. According to one embodiment, a component (e.g., an RFIC) other than the radiator may be additionally formed as a part of the antenna module 197.

At least some of the components may be connected to each other via a communication mode between peripheral devices (e.g., a bus, General-Purpose Input and Output (GPIO), Serial Peripheral Interface (SPI), or Mobile Industry Processor Interface (MIPI)) and may exchange signals (e.g., a command or data) with each other.

According to one embodiment, a command or data may be transmitted or received between the electronic device 101 and the external electronic device 104 via the server 108 connected to the second network 199. Each of the electronic devices 102 and 104 may be a device of the same kind or a different kind from the electronic device 101. According to one embodiment, all or some operations performed by the electronic device 101 may be performed by one or more external electronic devices among the external electronic devices 102, 104, or 108. For example, when the electronic device 101 needs to perform a function or a service automatically or upon request from a user or another device, the electronic device 101 may, instead of or in addition to autonomously executing the function or the service, request at least one or more external electronic devices to perform at least part of the function or the service. Upon receiving such a request, the one or more external electronic devices may execute the at least part of the requested function or service or an additional function or service associated with the request and may transmit the result of execution thereof to the electronic device 101. The electronic device 101 may provide the result, as at least part of a response to the request, without any processing or via additional processing. To this end, for example, cloud-computing, distributed-computing, or client-server-computing technologies may be used.

Electronic devices 101 have become smaller and portable. Given the portability, it may be desirable for the device to be powered by a battery 189. However, the battery may only be able to provide power for a certain amount of time, at which point the battery 189 may have to be charge. Charging the battery often mean using a chord connecting the device to a power outlet.

Wireless charging alleviates the need to connected the electronic device to the power outlet. Wireless charging can include electromagnetic induction using a coil or resonance, and a Radio Frequency (RF)/microwave radiation method of converting electrical energy into microwaves and transmitting the microwaves. When a wireless Power Transmitting Unit (charger, or a wireless charging pad) and a wireless Power Receiving Unit (PRU, a charged device such as a smartphone or an electronic device) come in contact with each other are in proximity to each other within a certain distance, the battery of the PRU can be charged using electromagnetic induction or electromagnetic resonance between a transmission coil of the wireless PTU and a reception coil of the wireless PRU.

Figure 2:
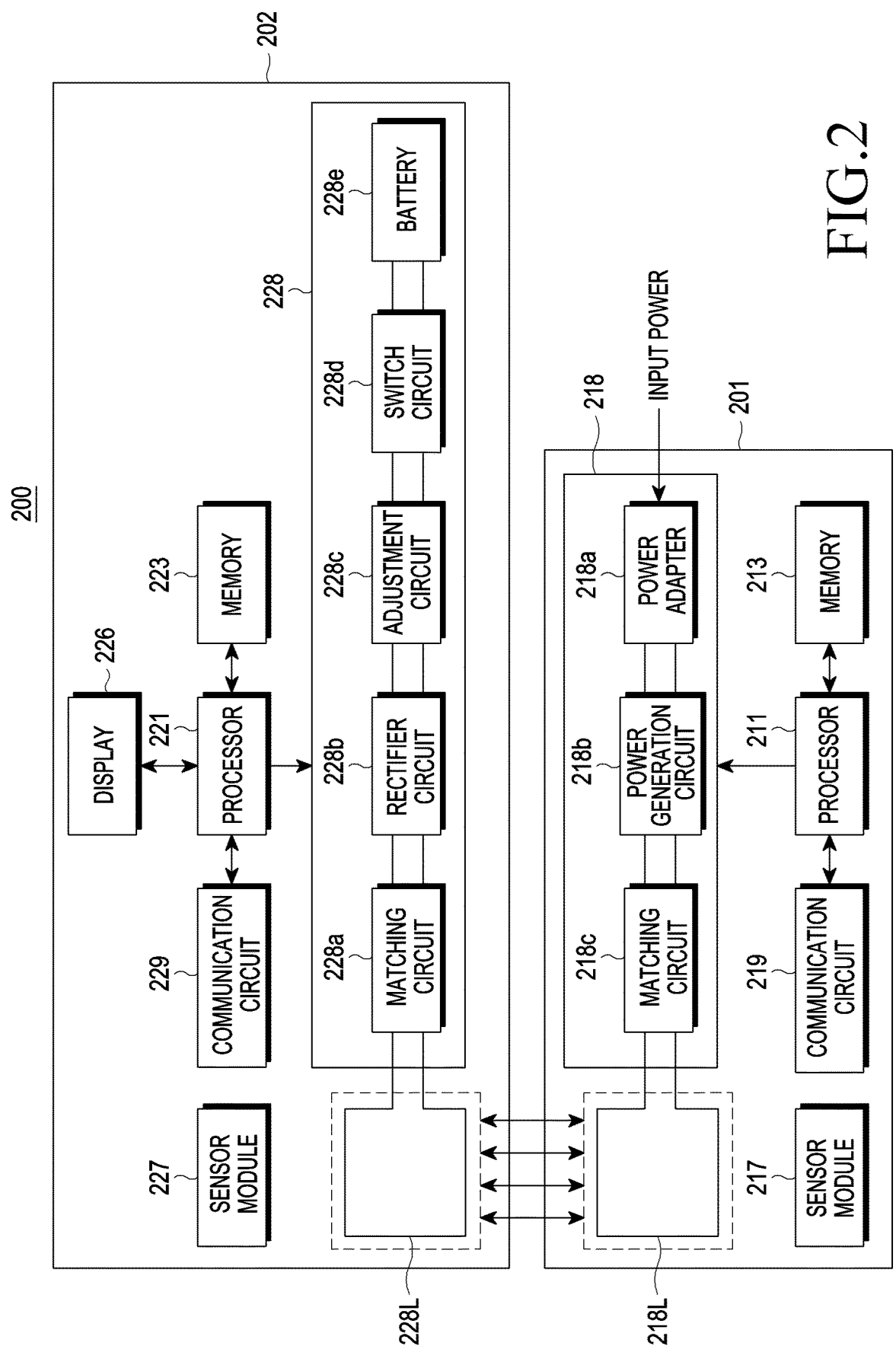
FIG. 2 illustrates a wireless charging environment according to certain embodiments.

FIG. 2 is a diagram 200 illustrating a wireless charging environment according to certain embodiments.

Referring to FIG. 2, an electronic device 201 (e.g., 102 in FIG. 1) (hereinafter, also referred to as a "wireless power transmission device" which can also be referred to as a wireless charger) according to certain embodiments may wirelessly supply power to an external electronic device 202 (e.g., 101 in FIG. 1) (hereinafter, also referred to as a "wireless power reception device" which can also be referred to as a wirelessly charged device), and the external electronic device 202 may wirelessly receive power.

Wireless Power Transmission Device

The wireless power transmission device 201 according to certain embodiments may include at least one of a power transmission circuit 218, a processor 211 (e.g., the processor 120 of FIG. 1, in this document, "processor" shall be understood to also include the plural context), a memory 213 (e.g., the memory 130 of FIG. 1), a sensor module 217 (e.g., the sensor module 176 of FIG. 1), or a communication circuit 219 (e.g., the communication module 190 of FIG. 1).

The power transmission circuit 218 may include a power adapter 218a that receives power (or electricity) from the outside, such as from a power outlet, and appropriately converts the voltage of the input power, a power generation circuit 218b that generates power, a matching circuit 218c that can maximize efficiency between a transmission coil 218L and a reception coil 228L, or the transmission coil 218L.

The power transmission circuit 218 may include a plurality of transmission coils in the transmission coil 218L in order to transmit power to a plurality of wireless power reception devices (e.g., a first external electronic device and a second external electronic device) at least portions of the power adapter 218a, the power generation circuit 218b, or the matching circuit 218c.

The processor 211 may control the overall operation of the wireless power transmission device 201 using a program, or an application required for control, which is read from the memory 213. The processor 211 may generate various signals or information necessary for wireless power transmission and may transmit the signals or information to the communication circuit 219. The processor 211 may calculate power (or the amount of power) to transmit to wireless power reception device 202 on the basis of information received from communication circuit 219. The processor 211 may also control the power transmission circuit 218 such that power generated by the transmit coil 218L is transmitted to the wireless power reception device 202.

When transmitting power to each of a plurality of wireless power reception devices (e.g., a first external electronic device and a second external electronic device), the processor 211 may control the communication circuit 219 to transmit a first signal for requesting device-related information to the plurality of wireless power reception devices. For example, the device-related information may include device identification information or device state information. The device identification information is information for uniquely identifying the wireless power reception device 202 and may include at least one of a device type, a device name, or an MAC address. In addition, the device state information is information for identifying the state of the wireless power reception device 202 and may include at least one of a display characteristic, a battery characteristic, a charging state, or a user configuration.

The processor 211 may broadcast the first signal through the communication circuit 219. Broadcasting may refer to a method of transmitting a signal or message to an unspecified destination (or recipient), a random destination device (or a plurality of unspecified devices), or to transmitting a signal receivable by any electronic device equipped with a particular radio front end. The processor 211 may control the communication circuit 219 to transmit the first signal in response to transmission of charging power to a new wireless power reception device (e.g., a second external electronic device) while transmitting charging power to at least one wireless power reception device (e.g., a first external electronic device) through a plurality of transmission coils 218L. In one embodiment, the processor 211 may control the communication circuit 219 to transmit the first signal according to the preset period while transmitting charging power to a plurality of wireless power reception devices (e.g., a first external electronic device and a second external electronic device) via the plurality of transmission coils 218L.

The processor 211 may receive a at least one first response signal(s) to the first signal via the communication circuit 219. The received at least one first response signal(s) (first response signals shall now be understood to include the singular context) may include the device-related information requested via the first signal. The processor 211 may identify the number of wireless power reception devices being charged by the wireless power transmission device 201. The processor 211 may select at least one wireless power reception device from among the plurality of wireless power reception devices on the basis of information included in the first response signals. The processor 211 may make the selection during a preset period of time following transmission of the first signal.

According to certain embodiments, the processor 211 may select at least one wireless power reception device (e.g., a first external electronic device or a second external electronic device) on the basis of information included in received first response signals, on the basis of the information included in the received first response signals and information previously stored in the memory 213 of the wireless power transmission device 201.

Alternatively, the processor 211 may select at least one wireless power reception device on the basis of the information included in the received first response signals and information obtained from the wireless power transmission device 201 in relation to power transmission.

For example, the processor 211 may identify information including at least one of the presence or absence of a display in each wireless power reception device, a display size, a display resolution, display performance (e.g., power consumption or an Always On Display (AOD) function), or a display configuration (e.g., a brightness setting). The foregoing (presence or absence of a display in each wireless power reception device, a display size, a display resolution, display performance or a display configuration, now collectively referred to as "display attributes") can be determined at least on the basis of device-related information about the plurality of wireless power reception devices included in the first response signals or the information previously stored in the memory 213. From the display attributes, the processor 211 can compare display attributes, and for example, may select the wireless power receiving device with this highest quality screen. The processor 211 may select at least one wireless power reception device by comparing the identification information.

Alternatively, the processor 211 may select at least one wireless power reception device disposed at a more easily viewed position on the basis of the charging position of wireless power reception devices.

The at least one selected wireless power reception device may be instructed to display device state information. For example, the at least one selected wireless power reception device may display device state information including at least one of the total battery capacity, the remaining battery capacity, battery usage, a charging mode, or an estimated remaining time to full charge as charging state information about each of the plurality of wireless power reception devices receiving wireless power from the wireless power transmission device 201. That is, a selected wireless power reception device may display device state information of not only itself, but each of the other devices that are being charged by the wireless power transmission device 201.

In one embodiment, it may be indicated that the at least one selected wireless power reception device is capable of displaying the device state information. Alternatively, a priority in displaying the device state information may be indicated to the at least one selected wireless power reception device. Alternatively, the at least one selected wireless power reception device may be instructed to perform an operation associated with a device configuration. For example, the at least one selected wireless power reception device may be instructed to establish a connection for communication (e.g., a connection for pairing, such as Bluetooth) between a plurality of wireless power reception devices. In certain embodiments, the at least one selected wireless power reception device can determine the device state information using the connection for communication. The selected wireless power reception device can query the plurality of wireless power reception devices for their respective devices states.

Alternatively, the at least one selected wireless power reception device may be instructed to perform an operation associated with registered user information. For example, when a plurality of wireless power reception devices is selected, the selected wireless power reception devices may be instructed to perform an operation in a secure mode according to user information registered in each wireless power reception device.

According to certain embodiments, the processor 211 may transmit a second signal via the communication circuit 219. The second signal can indicates/identifies the at least one selected wireless power reception device and includes at least information associated with the plurality of wireless power reception devices. In one embodiment, the processor 211 may control the communication circuit 219 to transmit the second signal in response to selection of at least one of the plurality of wireless power reception devices. Alternatively, the processor 211 may control the communication circuit 219 to transmit the second signal in response to selection of a new wireless power reception device, with at least one wireless power reception device selected. Alternatively, the processor 211 may control the communication circuit 219 to transmit the second signal according to the preset period while at least one selected wireless power reception device is maintained.

According to certain embodiments, the processor 211 may receive via the communication circuit 219 information or signals from a plurality of wireless power reception devices in response to the second signal. In one embodiment, the processor 211 may receive information associated with a designated operation from at least one unselected wireless power reception device in response to the second signal. For example, the information associated with the designated operation may include device state information including at least one of the total battery capacity, the remaining battery capacity, battery usage, a charging mode, or an estimated remaining time to full charge for displaying charging state information about each wireless power reception device. In one embodiment, the processor 211 may receive a second response signal for requesting information associated with a designated operation from the at least one selected wireless power reception device in response to the second signal. The processor 211 may transmit the information associated with the designated operation (requested via the received second response signal) to the at least one selected wireless power reception device. For example, when the designated operation is a display of device state information, the processor 211 may transmit information associated with a display of device state information received from a plurality of wireless power reception devices to the at least one selected wireless power reception device.

According to certain embodiments, the sensor module 217 may include at least one sensor and may detect at least one state of the wireless power transmission device 201 using the at least one sensor. The sensor module 217 may include at least one of a temperature sensor, a motion sensor, a proximity sensor, a pressure sensor, or a current (or voltage) sensor. The sensor module 217 may detect the temperature of the wireless power transmission device 201 using the temperature sensor, may detect the movement of the wireless power transmission device 201 using the motion sensor, may detect an external object that approaches or is mounted on the wireless power transmission device 201 using the proximity sensor or the pressure sensor, and may detect the state, for example, the current level, the voltage level, or the power level, of an output signal from the wireless power transmission device 201 using the current (or voltage) sensor. In one embodiment, the current (or voltage) sensor may measure a signal in the power transmission circuit 218. The current (or voltage) sensor may measure a signal in at least some areas of the transmission coil 218L, the matching circuit 218c, or the power generation circuit 218b. For example, the current (or voltage) sensor may include a circuit that measures a signal at the front end of the transmission coil 218L. In one embodiment, the sensor module 217 may be a circuit for Foreign Object Detection (FOD).

According to certain embodiments, the communication circuit 219 may be configured to provide at least one of Bluetooth Low Energy (BLE) communication, wireless charging protocol communication, Bluetooth (BT) communication, Wi-Fi communication, or Near-Field Communication (NFC). For example, the communication circuit 219 may perform broadcast, unicast, or multicast.

According to certain embodiments, the communication circuit 219 may be configured in a single piece of hardware with the power transmission circuit 218 such that the wireless power transmission device 201 may provide wireless charging protocol communication to enable in-band communications or may be configured in a different piece of hardware from the power transmission circuit 218 such that the wireless power transmission device 201 may provide at least one of BLE communication, BT communication, Wi-Fi communication, or NFC to enable out-of-band communication.

Wireless Power Reception Device

The wireless power reception device 202 according to certain embodiments may include at least one of a power reception circuit 228 (e.g., the power management module 188 of FIG. 1), a processor 221 (e.g., the processor 120 of FIG. 1), a memory 223 (e.g., the memory 130 in FIG. 1), a sensor module 227 (e.g., the sensor module 176 in FIG. 1), a communication circuit 229 (e.g., the communication module 190 of FIG. 1), or a display 226 (e.g., the display device 160 of FIG. 1). A description of components of the wireless power reception device 202 corresponding to those of the wireless power transmission device 201 may be partially omitted.

The power reception circuit 228 may include the reception coil 228L that wirelessly receives power from the wireless power transmission device 201, a matching circuit 228a, a rectifier circuit 228b, an adjustment circuit 228c, a switch circuit 228d, or a battery 228e.

The processor 221 may control the overall operation of the wireless power reception device 202. The processor 221 may control the overall operation of the wireless power reception device 202 using a program, or an application required for control, which is read from the memory 223. The processor 221 may generate various signals or information necessary for wireless power reception and may transmit the signals or information to the communication circuit 229.

The processor 221 may control the communication circuit 229 to receive a first signal for requesting device-related information from the wireless power transmission device 201.

The processor 221 may transmit a first response signal to the first signal via the communication circuit 229. The first response signal may include the device-related information requested via the first signal. In one embodiment, when receiving charging power from the wireless power transmission device 201, the processor 221 may control the communication circuit 229 to transmit the first response signal in response to reception of the first signal.

The processor 221 may receive a second signal via the communication circuit 229. The second signal may indicate that at least one wireless power reception device (e.g., a first external electronic device or a second external electronic device) is selected from among a plurality of wireless power reception devices (e.g., the first external electronic device and the second external electronic device) and includes among other things, information associated with the plurality of wireless power reception devices. According to certain embodiments, the second signal may include an instruction for at least one selected wireless power reception device to perform a designated operation.

Upon identifying that the wireless power reception device 202 is selected (on the basis of the second signal), the processor 221 may control the communication circuit 229 to transmit a second response signal. The second response signal requests information associated with the designated operation on the basis of the information associated with the plurality of wireless power reception devices included in the second signal.

Upon identifying that the wireless power reception device 202 is not selected (on the basis of the signal), the processor 221 may control the communication circuit 229 to transmit the information associated with the designated operation to the wireless power transmission device 201 on the basis of the information included in the second signal.

The sensor module 227 may include at least one sensor and may detect at least one state of the wireless power reception device 202 using the at least one sensor. According to certain embodiments, the sensor module 227 may include at least one of a temperature sensor, a motion sensor, a proximity sensor, an illumination sensor, or a current (or voltage) sensor, and may detect the wireless power transmission device 201 by detecting a discovery signal or received power from the wireless power transmission device 201. The sensor module 227 may detect a signal change in the reception coil 228L, the matching circuit 228a, or input and output terminals of the rectifier circuit 228b due to a signal of the reception coil 228L generated by a signal output from the wireless power transmission device 201.

The communication circuit 229 may be configured to provide at least one of BLE communication, wireless charging protocol communication, BT communication, Wi-Fi communication, or NFC. For example, the communication circuit 229 may perform broadcast, unicast, or multicast.

According to certain embodiments, the display 226 may display general information associated with the charging state of the wireless power reception device 202. When the wireless power reception device 202 is instructed to display device state information associated with a plurality of wireless power reception devices, the display 226 may display device state information including at least one of the total battery capacity, the remaining battery capacity, battery usage, a charging mode, or an estimated remaining time to full charge as charging state information about the plurality of wireless power reception devices. According to certain embodiments, the display 226 may display an execution screen of various applications executed in the wireless power reception device 202 and may be configured to include an input device, such as a touch screen.

Figure 3:
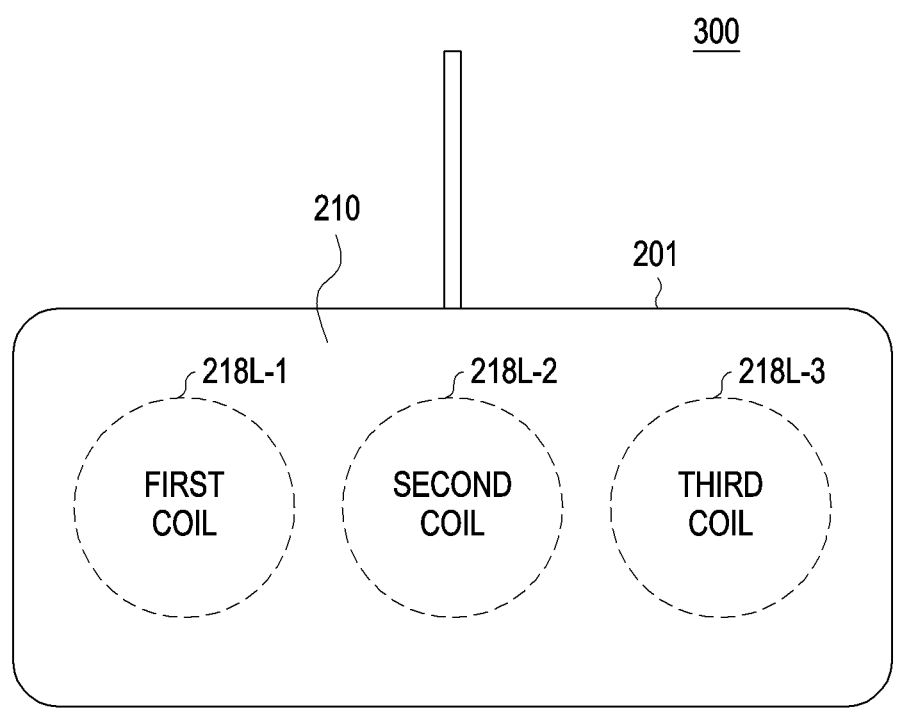
FIG. 3 illustrates a wireless power transmission device according to certain embodiments.

FIG. 3 is a diagram 300 illustrating a portion of the wireless power transmission device according to certain embodiments.

Referring to FIG. 3, an electronic device 201 (e.g., the electronic device 102 of FIG. 1 or the wireless power transmission device 201 of FIG. 2) according to certain embodiments may be a wireless charging pad on which a plurality of external electronic devices (e.g., the electronic device 101 of FIG. 1 or the wireless power reception device 202 of FIG. 2), for example, three or more external electronic devices, may be placed. The wireless charging pad 201 may include a housing 210 in which a part on which a plurality of external electronic devices is mounted or placed is not identified or divided. The housing 210 of the wireless charging pad 201 may include a plurality of coils 218L-1, 218L-2, and 218L-3 for wirelessly supplying charging power to a plurality of external electronic devices to be charged by a magnetic induction method or a magnetic resonance method. For example, the wireless charging pad 201 may be supplied with power from the outside via a cable and may supply the power to the plurality of coils 218L-1, 218L-2, and 218L-3. The coils may be formed in a spiral shape and may be provided at different positions in order to enhance the efficiency of power supply. Further, each of the coils 218L-1, 218L-2, and 218L-3 may be activated to wirelessly transmit power under the control of the wireless charging pad 201 and may be deactivated.

Figure 4:
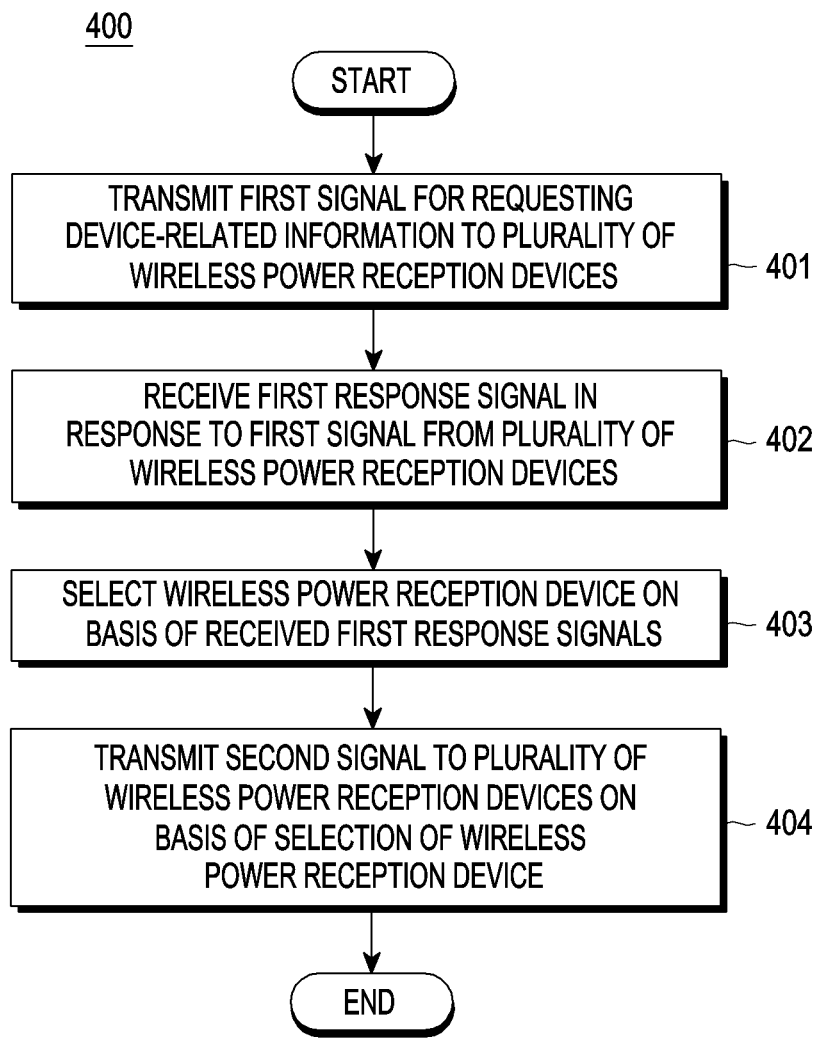
FIG. 4 is a flowchart illustrating the operation of a wireless power transmission device according to certain embodiments.

FIG. 4 is a flowchart 400 illustrating the operation of a wireless power transmission device according to certain embodiments.

According to certain embodiments, operation 401 to operation 404 may be understood as a plurality of operations performed by an electronic device (e.g., the electronic device 102 of FIG. 1, the wireless power transmission device 201 of FIG. 2, or the wireless charging pad 201 of FIG. 3) or a processor (e.g., the processor 120 of FIG. 1 or the processor 211 of FIG. 2, among which the processor 211 of FIG. 2 is illustrated in the following description) of an electronic device. The wireless power transmission device

201 may store instructions to execute operation 401 to operation 404 in a memory (e.g., the memory 130 of FIG. 1 or the memory 213 of FIG. 2). Execution of the instructions by the processor 211 may cause the processor 211 to perform operations 401 to 404. In one embodiment, at least one of operation 401 to operation 404 may be omitted, some operations thereof may be performed in parallel at the same time, some operations thereof may be performed in a different order, or other operations may be added.

Referring to FIG. 4, in operation 401, the processor 211 according to certain embodiments may control a communication circuit (e.g., the communication module 190 of FIG. 1 or the communication circuit 219 of FIG. 2) to transmit a first signal for requesting device-related information to a plurality of external electronic devices (e.g., the electronic device 101 of FIG. 1 or the wireless power reception device 202 of FIG. 2). For example, the device-related information may include device identification information or device state information. The device identification information is information for uniquely identifying the wireless power reception device 202 and may include at least one of a device type, a device name, or an MAC address. In addition, the device state information is information for identifying the state of the wireless power reception device 202 and may include at least one of a display characteristic, a battery characteristic, a charging state, or a user configuration. For example, the processor 211 may transmit the first signal in a broadcasting manner. The processor 211 may transmit the first signal in response to detecting transmission of charging power to a new wireless power reception device (e.g., a second external electronic device) while transmitting charging power to at least one other wireless power reception device (e.g., a first external electronic device). Alternatively, the processor 211 may transmit the first signal according to the preset period (polling) while transmitting charging power to a plurality of wireless power reception devices (e.g., a first external electronic device and a second external electronic device).

In operation 402, the processor 211 may receive a plurality of first response signals to the first signal via the communication circuit 219. The plurality of first response signals can correspond to each one of the plurality of wireless power reception devices. The received first response signals may include the device-related information of the corresponding one of the plurality of wireless power reception device, as requested via the first signal.

In operation 403, the processor 211 may select at least one wireless power reception device from among a plurality of wireless power reception devices on the basis of received first response signals. For example, the processor 211 may identify the number of a plurality of wireless power reception devices to which charging power is transmitted and may select at least one wireless power reception device on the basis of information included in the plurality of first response signals upon receiving a first response signal from each one of the plurality of wireless power reception devices. Alternatively, the processor 211 may select the at least one wireless power reception device on the basis of information included in first response signals received within a preset time from transmission of the first signal.

According to certain embodiments, the processor 211 may select the at least one wireless power reception device based on a variety of criteria. For example, the processor may select the at least one wireless power reception device on the basis of information included in the received first response signals, may select the at least one wireless power reception device on the basis of the received first response signals and information previously stored in the memory 213 of the wireless power transmission device 201, or may select the at least one wireless power reception device on the basis of the received first response signals and information obtained from the wireless power transmission device 201 in relation to power transmission. For example, the processor 211 may identify information including at least one of the presence or absence of a display in each wireless power reception device, a display size, a display resolution, display performance (e.g., power consumption or an Always On Display (AOD) function), or a display configuration (e.g., a brightness setting) at least on the basis of device-related information about the plurality of wireless power reception devices included in the first response signals. From the foregoing information, the processor 211 may determine and may select at least one wireless power reception device by comparing the display attributes. Alternatively, the processor 211 may select a wireless power reception device disposed at a more easily viewed position on the basis of the charging position of wireless power reception devices.

In operation 404, the processor 211 may transmit a second signal that indicates the at least one selected wireless power reception device and includes among other information, information associated with the plurality of wireless power reception devices via the communication circuit 219. For example, the second signal may include an instruction to display device state information on at least one selected wireless power reception device. The at least one wireless power reception device selected via the second signal may display device state information including at least one of the total battery capacity, the remaining battery capacity, battery usage, a charging mode, or an estimated remaining time to full charge as charging state information about a plurality of wireless power reception devices. Alternatively, the second signal may indicate at least one wireless power reception device capable of displaying the device state information. In this case, the device state information may be displayed on a plurality of wireless power reception devices, or it may be determined whether to display the device state information on a plurality of wireless power reception devices, and the device state information may or may not be displayed on the plurality of wireless power reception devices according to the determination result. Alternatively, the second signal may indicate a priority in displaying the device state information. Alternatively, the second signal may include an instruction for the selected wireless power reception device to perform an operation associated with a device configuration. For example, the second signal may include an instruction to establish a connection for communication (e.g., a connection for pairing) between a plurality of wireless power reception devices. Alternatively, when a plurality of wireless power reception devices is selected, the second signal may include an instruction to perform an operation in a secure mode according to user information registered in each wireless power reception device.

Figure 5:
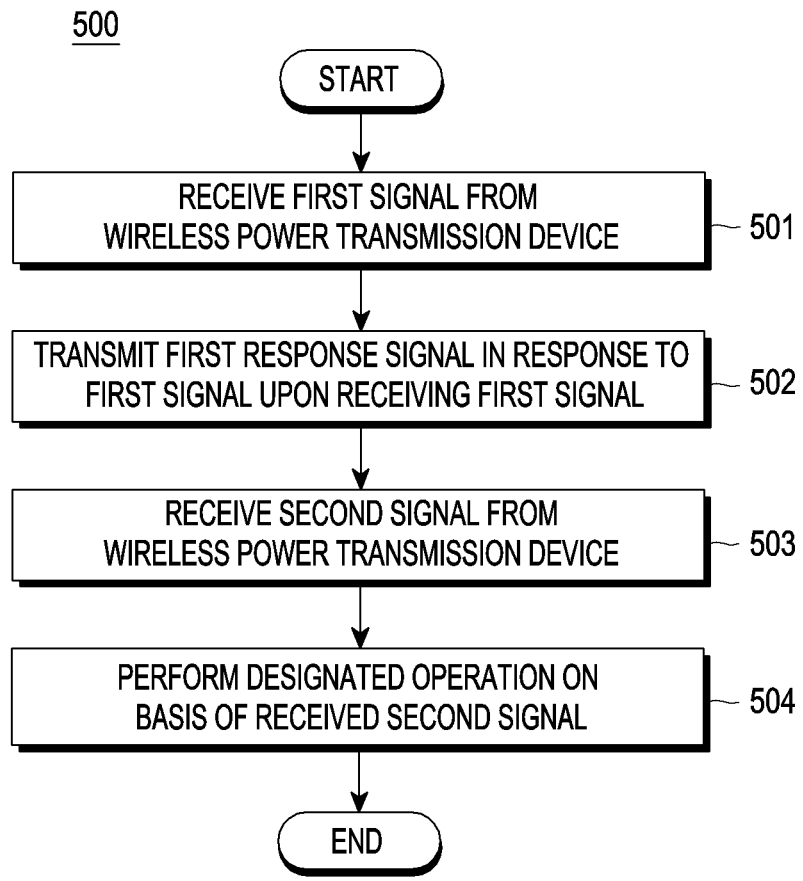
FIG. 5 is a flowchart illustrating the operation of a wireless power reception device according to certain embodiments.

FIG. 5 is a flowchart 500 illustrating the operation of a wireless power reception device according to certain embodiments.

According to certain embodiments, operation 501 to operation 504 may be understood as operations performed by an electronic device (e.g., the electronic device 101 of FIG. 1 or the wireless power reception device 202 of FIG. 2) or a processor (e.g., the processor 120 of FIG. 1 or the processor 211 of FIG. 2, among which the processor 211 of FIG. 2 is illustrated in the following description) of an electronic device. The wireless power reception device 202 may store instructions to execute operation 501 to operation 504 in a memory (e.g., the memory 130 of FIG. 1 or the memory 223 of FIG. 2). The execution of the instructions may cause the processor 211 to perform operations 501-504. In one embodiment, at least one of operation 501 to operation 504 may be omitted, some operations thereof may be performed in parallel at the same time, some operations thereof may be performed in a different order, or other operations may be added.

Referring to FIG. 5, in operation 501, the processor 221 according to certain embodiments may control a communication circuit (e.g., the communication module 190 of FIG. 1 or the communication circuit 229 of FIG. 2) to receive a first signal for requesting device-related information from the wireless power transmission device 201. For example, the device-related information may include device identification information or device state information. The device identification information is information for uniquely identifying the wireless power reception device 202 and may include at least one of a device type, a device name, or an MAC address. In addition, the device state information is information for identifying the state of the wireless power reception device 202 and may include at least one of a display characteristic, a battery characteristic, a charging state, or a user configuration.

In operation 502, the processor 221 may transmit via the communication circuit 229 a first response signal to the first signal. The first response signal may include the device-related information requested via the first signal. For example, when receiving charging power from the wireless power transmission device 201, the processor 221 may transmit the first response signal in response to reception of the first signal.

In operation 503, the processor 221 may receive a second signal that indicates at least one wireless power reception device (e.g., a first external electronic device or a second external electronic device) selected from among a plurality of wireless power reception devices (e.g., the first external electronic device and the second external electronic device) and includes at least information associated with the plurality of wireless power reception devices from the wireless power transmission device 201 via the communication circuit 229. For example, the second signal may include an instruction for at least one selected wireless power reception device to perform a designated operation.

In operation 504, the processor 221 may perform the designated operation on the basis of the received second signal. For example, the processor 221 may identify a selected wireless power reception device 202 and include instruction(s) for selected wireless power reception devices 202 and instruction(s) for unselected wireless power reception devices 202. At 504, the wireless power reception device performs a designated operation based on whether it is selected in the received second signal.

Figure 6:
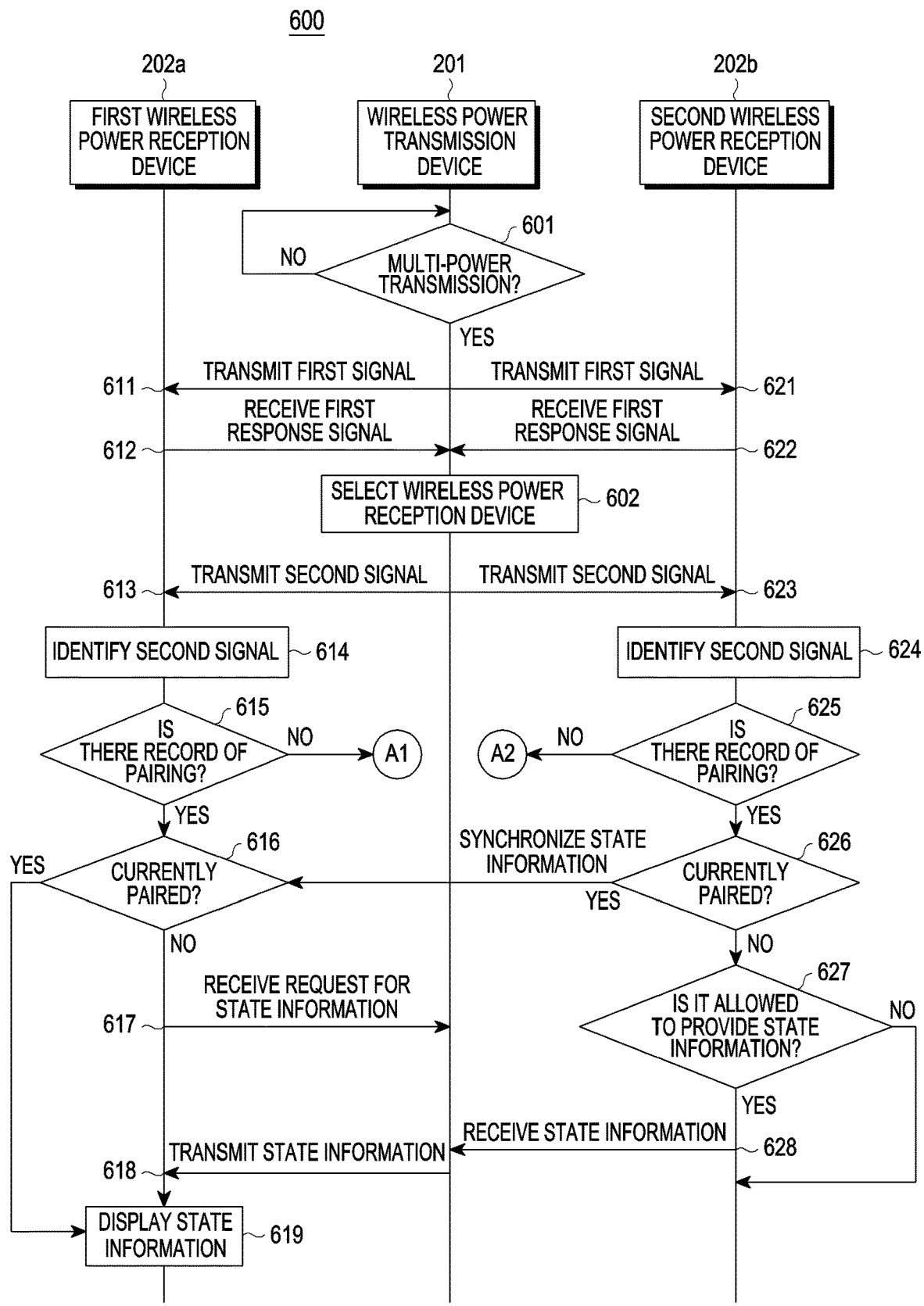
FIG. 6 is a flowchart illustrating the operation of a wireless power transmission device and a wireless power reception device according to certain embodiments.
Figure 7:
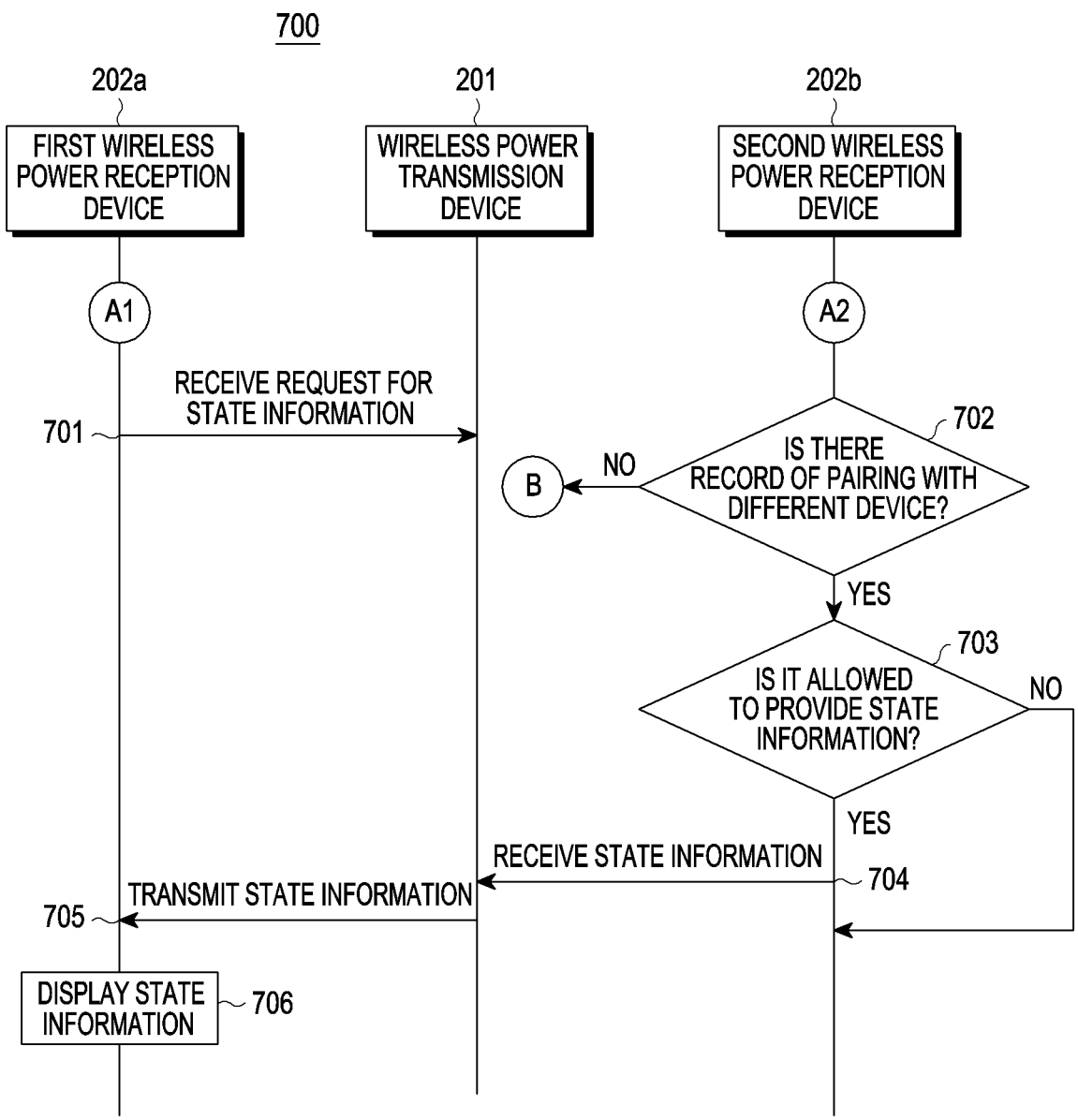
FIG. 7 is a flowchart illustrating the operation of a wireless power transmission device and a wireless power reception device according to certain embodiments.
Figure 8:
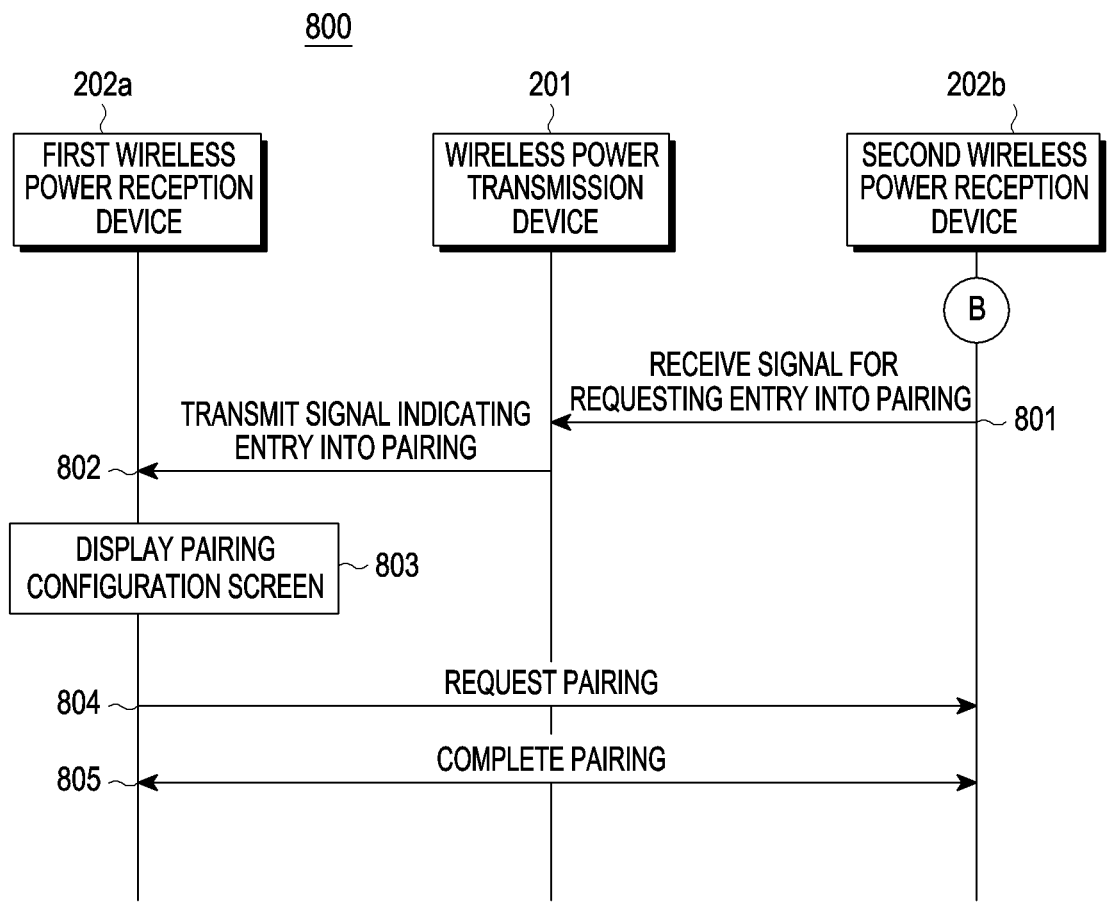
FIG. 8 is a flowchart illustrating the operation of a wireless power transmission device and a wireless power reception device according to certain embodiments.
Figure 9:
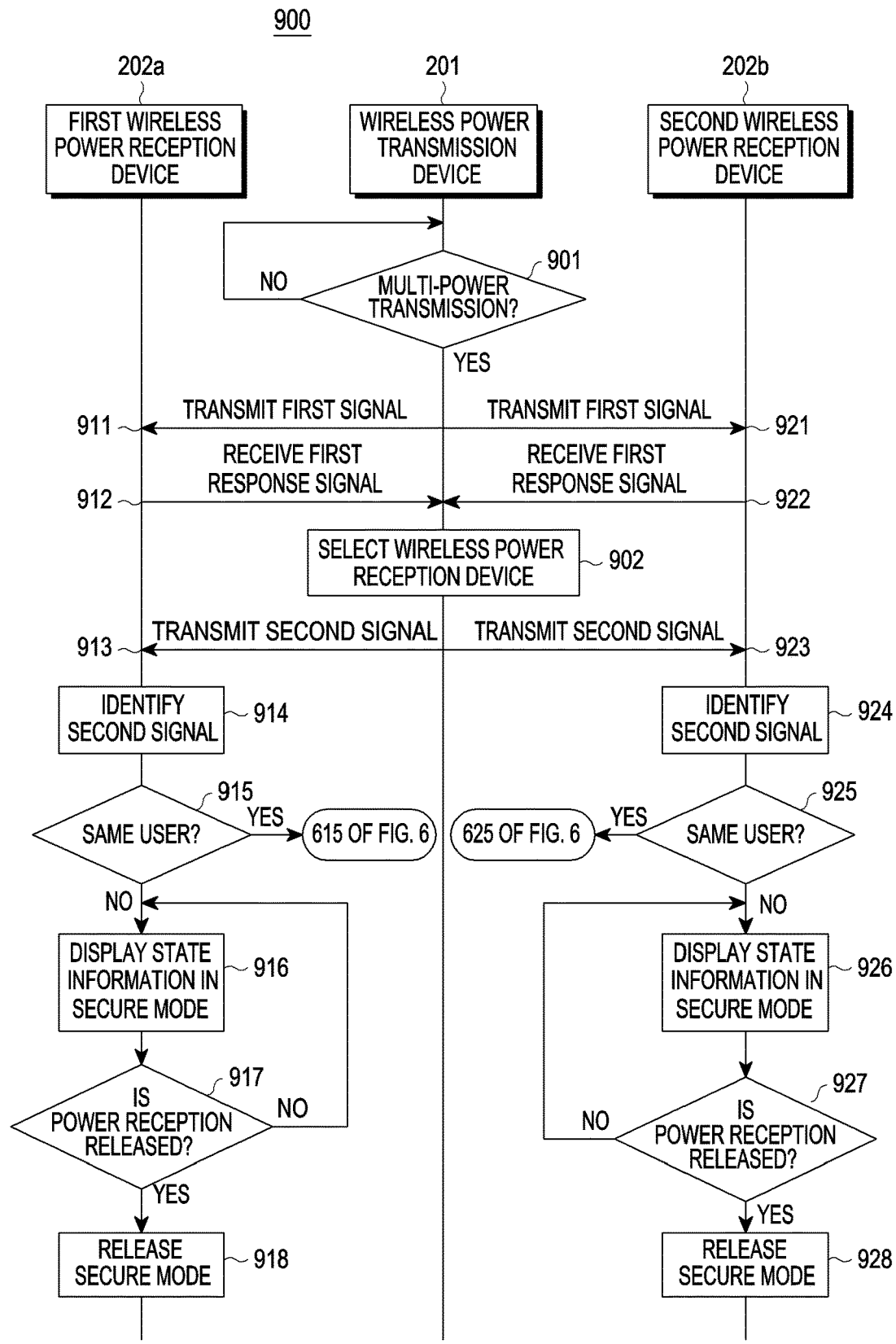
FIG. 9 is a flowchart illustrating the operation of a wireless power transmission device and a wireless power reception device according to certain embodiments.

FIG. 6 is a flowchart 600 illustrating the operation of a wireless power transmission device and a wireless power reception device according to certain embodiments, FIG. 7 is a flowchart 700 illustrating the operation of a wireless power transmission device and a wireless power reception device according to certain embodiments, FIG. 8 is a flowchart 800 illustrating the operation of a wireless power transmission device and a wireless power reception device according to certain embodiments, and FIG. 9 is a flowchart 900 illustrating the operation of a wireless power transmission device and a wireless power reception device according to certain embodiments According to certain embodiments, operation 601 to operation 627 in FIG. 6, operation 701 to operation 706 in FIG. 7, operation 801 to operation 805 in FIG. 8, and operation 901 to operation 928 in FIG. 9 may be understood as operations performed by a wireless power transmission device 201 (e.g., the electronic device 102 of FIG. 1, the wireless power transmission device 201 of FIG. 2, or the wireless charging pad 201 of FIG. 3), a first wireless power reception device 202a (e.g., the electronic device 101 of FIG. 1 or the wireless power reception device 202 of FIG. 2), a second wireless power reception device 202b (e.g., the electronic device 101 of FIG. 1 or the wireless power reception device 202 of FIG. 2), or a processor (e.g., the processor 120 of FIG. 1 or the processor 211 or 212 of FIG. 2) of an electronic device. Instructions to execute the foregoing operations may be stored in a memory (e.g., the memory 130 of FIG. 1 or the memory 213 or 233 of FIG. 2). In one embodiment, at least one of the operations may be omitted, some operations thereof may be performed in parallel at the same time, some operations thereof may be performed in a different order, or other operations may be added.

Referring to FIG. 6, when a plurality of wireless power reception devices 202a and 202b is placed on a pad (e.g., the housing 210 of FIG. 3) in which a plurality of coils (e.g., a first coil 218L-1, a second coil 218L-2, and a third coil 218L-3 of FIG. 3) is installed, the wireless power transmission device 201 may transmit charging power to the plurality of wireless power reception devices 202a and 202b.

In operation 601, the wireless power transmission device 201 may identify whether the charging power is transmitted to the plurality of wireless power reception devices 202a and 202b. When it is identified that the charging power is transmitted to the plurality of wireless power reception devices 202a and 202b, the wireless power transmission device 201 may perform operation 611 and operation 621. When it is identified that the charging power is transmitted to one wireless power reception device 202a or 202b, the wireless power transmission device 201 may perform no operation or may maintain wireless power transmission to the one wireless power reception device 202a or 202b.

In operation 611 and operation 621, the wireless power transmission device 201 may transmit a first signal for requesting device-related information to a plurality of wireless power reception devices (e.g., the first wireless power reception device 202a and the second wireless power reception device 202b). For example, the first signal may be broadcast.

In operation 612 and operation 622, the wireless power transmission device 201 may receive first response signals to the first signal from the first wireless power reception device 202a and the second wireless power reception device 202b.

In operation 602, the wireless power transmission device 201 may select at least one wireless power reception device 202a or 202b from among the first wireless power reception device 202a and the second wireless power reception device 202b on the basis of the received first response signals. For example, the wireless power transmission device 201 may select at least one wireless power reception device 202a or 202b using one of the ways previously described.

In operation 613 and operation 623, the wireless power transmission device 201 may transmit a second signal that indicates the wireless power reception device 202a or 202b selected from among the first wireless power reception device 202a and the second wireless power reception device 202b and includes at least information associated with the first wireless power reception device 202a and the second wireless power reception device 202b. Here, it is assumed that the first wireless power reception device 202a is selected for illustrative purposes, although in another embodiments, the second wireless power reception device 202b can be selected.

In operation 614, the first wireless power reception device 202a may identify the received second signal. For example, the first wireless power reception device 202a may determine that the first wireless power reception device 202a was selected at 602.

In operation 624, the second wireless power reception device 202b may identify the received second signal. For example, the second wireless power reception device 202b may identify the selected wireless power reception device was not selected at 602.

When it is identified that the first wireless power reception device 202a is selected on the basis of the second signal, the first wireless power reception device 202a may identify the information associated with the second wireless power reception device 202b included in the second signal in operation 615. For example, the first wireless power reception device 202a may identify whether there is a record of previous pairing with the second wireless power reception device 202b on the basis of device identification information of the second wireless power reception device 202b included in the second signal. When it is identified that there is a record of pairing with the second wireless power reception device 202b, the first wireless power reception device 202a may perform operation 616. When it is identified that there is no record of pairing, the first wireless power reception device 202a may proceed pair with the second wireless power reception device 202b (which will be described in operation A1, FIG. 7). In one embodiment, operation 615 in which the first wireless power reception device 202a identifies a record of previous pairing may be omitted. In this case, when it is identified that the first wireless power reception device 202a is selected on the basis of the second signal in operation 614, the first wireless power reception device 202a may immediately perform operation 616.

When it is identified that the second wireless power reception device 202b is not selected on the basis of the second signal, the second wireless power reception device 202b may identify the information associated with the first wireless power reception device 202a included in the second signal in operation 625. For example, the second wireless power reception device 202b may identify whether there is a record of previous pairing with the first wireless power reception device 202a on the basis of device identification information of the first wireless power reception device 202a included in the second signal. When it is identified that there is a record of pairing with the first wireless power reception device 202a, the second wireless power reception device 202b may perform operation 626. When it is identified that there is no record of pairing, the second wireless power reception device 202b may proceed to pairing with the first wireless power reception device 202b (further described in operation A2, FIG. 7). In one embodiment, operation 625 in which the second wireless power reception device 202b identifies a record of previous pairing may be omitted. In this case, when it is identified that the second wireless power reception device 202b is not selected on the basis of the second signal in operation 624, the second wireless power reception device 202b may immediately perform operation 626.

In operation 616, the first wireless power reception device 202a may identify whether pairing with the second wireless power reception device 202b is currently maintained. When it is identified that the pairing is currently maintained, the first wireless power reception device 202a may synchronize state information with the second wireless power reception device 202b and may perform operation 619. When it is identified that the pairing is not currently maintained, the first wireless power reception device 202a may perform operation 617.

In operation 626, the second wireless power reception device 202b may identify whether pairing with the first wireless power reception device 202a is currently maintained. When it is identified that the pairing is currently maintained, the second wireless power reception device 202b may synchronize state information with the first wireless power reception device 202a. When it is identified that the pairing is not currently maintained, the second wireless power reception device 202b may perform operation 627.

In operation 617, the first wireless power reception device 202a may transmit a second response signal for requesting state information to the wireless power transmission device 201, and the wireless power transmission device 201 may receive the second response signal from the first wireless power reception device 202a. In certain embodiments, the wireless power transmission device 201 may send a request for state information to the second wireless power redemption device 202b.

In operation 627, the second wireless power reception device 202b may identify whether it is allowed to provide state information. For example, the second wireless power reception device 202b may identify a user configuration associated with provision of state information and may identify whether it is allowed to provide the state information according to the identified user configuration. Alternatively, the second wireless power reception device 202b may display a configuration screen for identifying a user indication associated with sharing of state information on a display (e.g., the display device 160 of FIG. 1 or the display 226 of FIG. 2) and may identify whether it is allowed to provide the state information according to a user's response. When it is identified that it is allowed to provide the information, the second wireless power reception device 202b may perform operation 628. When it is identified that it is not allowed to provide the information, the second wireless power reception device 202b may not perform any operation or may perform a general operation.

In operation 628, the second wireless power reception device 202b may transmit the state information to the wireless power transmission device 201, and the wireless power transmission device 201 may receive the state information from the second wireless power reception device 202b.

In operation 618, the wireless power transmission device 201 may transmit the state information of the second wireless power reception device 202b to the first wireless power reception device 202a.

In operation 619, the first wireless power reception device 202a may display device state information on a display (e.g., the display device 160 of FIG. 1 or the display 226 of FIG. 2) using the received state information of the second wireless power reception device 202b. For example, the device state information may be displayed including charging state information about the first wireless power reception device 202a and the second wireless power reception device 202b.

Referring to FIG. 7, in operation 701, the first wireless power reception device 202a may transmit a state information request to the wireless power transmission device 201, and the wireless power transmission device 201 may receive the state information request from the first wireless power reception device 202a.

In operation 702, the second wireless power reception device 202b may identify whether there is a record of pairing with a different device. When it is identified that there is a record of pairing with a different device, the second wireless power reception device 202b may perform operation 703. When it is identified that there is no record of pairing with a different device, the second wireless power reception device 202b may proceed to operation B. In one embodiment, operation 702 in which the second wireless power reception device 202b identifies whether there is a record of pairing with a different device may be omitted. In this case, when it is identified that there is no record of pairing in operation 625 of FIG. 6, the second wireless power reception device 202b may immediately perform operation 703.

In operation 703, the second wireless power reception device 202b may identify whether it is allowed to provide state information. For example, the second wireless power reception device 202b may identify a user configuration associated with provision of state information and may identify whether it is allowed to provide the state information according to the identified user configuration. Alternatively, the second wireless power reception device 202b may display a configuration screen for identifying a user indication associated with sharing of state information on the display (e.g., the display device 160 of FIG. 1 or the display 226 of FIG. 2) and may identify whether it is allowed to provide the state information according to a user's response. When it is identified that it is allowed to provide the information, the second wireless power reception device 202b may perform operation 704. When it is identified that it is not allowed to provide the information, the second wireless power reception device 202b may not perform any operation or may perform a general operation.

In operation 704, the second wireless power reception device 202b may transmit the state information to the wireless power transmission device 201, and the wireless power transmission device 201 may receive the state information from the second wireless power reception device 202b.

In operation 705, the wireless power transmission device 201 may transmit the state information of the second wireless power reception device 202b to the first wireless power reception device 202a.

In operation 706, the first wireless power reception device 202a may display device state information on the display (e.g., the display device 160 of FIG. 1 or the display 226 of FIG. 2) using the received state information of the second wireless power reception device 202b. For example, the device state information may be displayed including charging state information about the first wireless power reception device 202a and the second wireless power reception device 202b.

Referring to FIG. 8, in operation 801, the second wireless power reception device 202b may transmit a signal for requesting entry into a pairing mode for a pairing connection to the wireless power transmission device 201 to request.

In operation 802, the wireless power transmission device 201 may transmit a signal indicating entry into a pairing mode for a pairing connection to the first wireless power reception device 202a in response to a request for entry into a pairing mode from the second wireless power reception device 202b.

In operation 803, the first wireless power reception device 202a may display a pairing configuration screen on the display (e.g., the display device 160 of FIG. 1 or the display 226 of FIG. 2) according to the signal indicating the entry into the pairing mode.

In operation 804, the first wireless power reception device 202a may establish pairing according to the user's response to the pairing configuration screen, and may request a pairing connection to the second wireless power reception device 202b upon receiving a request for a pairing connection with the second wireless power reception device 202b from the user.

In operation 805, the first wireless power reception device 202a and the second wireless power reception device 202b may complete a pairing connection according to the pairing connection procedure.

Referring to FIG. 9, when a plurality of wireless power reception devices 202a and 202b is placed on a pad (e.g., the housing 210 of FIG. 3) in which a plurality of coils (e.g., the first coil 218L-1, the second coil 218L-2, and the third coil 218L-3 of FIG. 3) is installed, the wireless power transmission device 201 may transmit charging power to the plurality of wireless power reception devices 202a and 202b.

In operation 901, the wireless power transmission device 201 may identify whether the charging power is transmitted to the plurality of wireless power reception devices 202a and 202b. When it is identified that the charging power is transmitted to the plurality of wireless power reception devices 202a and 202b, the wireless power transmission device 201 may perform operation 911 and operation 921. When it is identified that the charging power is transmitted to one wireless power reception device 202a or 202b, the wireless power transmission device 201 may perform no operation or may maintain wireless power transmission to the one wireless power reception device 202a or 202b.

In operation 911 and operation 921, the wireless power transmission device 201 may transmit a first signal for requesting device-related information to a plurality of wireless power reception devices (e.g., the first wireless power reception device 202a and the second wireless power reception device 202b). For example, the first signal may be broadcast.

In operations 912 and 922, the wireless power transmission device 201 may receive first response signals to the first signal from the first wireless power reception device 202a and the second wireless power reception device 202b.

In operation 902, the wireless power transmission device 201 may select at least one wireless power reception device 202a or 202b from among the first wireless power reception device 202a and the second wireless power reception device 202b on the basis of the received first response signals.

In operation 913 and operation 923, the wireless power transmission device 201 may transmit a second signal that indicates the wireless power reception device 202a or 202b selected from among the first wireless power reception device 202a and the second wireless power reception device 202b and includes at least information associated with the first wireless power reception device 202a and the second wireless power reception device 202b. Here, it is assumed that the first wireless power reception device 202a and the second wireless power reception device 202b are selected.

In operation 914, the first wireless power reception device 202a may identify the received second signal. For example, the first wireless power reception device 202a may identify the selected wireless power reception device on the basis of the second signal and may identify that the first wireless power reception device 202a is selected.

In operation 924, the second wireless power reception device 202b may identify the received second signal. For example, the second wireless power reception device 202b may identify the selected wireless power reception device on the basis of the second signal and may identify that the second wireless power reception device 202b is selected.

When it is identified that the first wireless power reception device 202a is selected on the basis of the second signal, the first wireless power reception device 202a may identify the information associated with the second wireless power reception device 202b included in the second signal in operation 915. For example, the first wireless power reception device 202a may identify information about a user registered in the second wireless power reception device 202b, which is included in the second signal, and may identify whether the second wireless power reception device 202b is owned by the same user. When it is identified that the second wireless power reception device 202b is not owned by the same user, the first wireless power reception device 202a may perform operation 916. When it is identified that the second wireless power reception device 202b is owned by the same user, the first wireless power reception device 202a may perform operation 615 of FIG. 6.

When it is identified that the second wireless power reception device 202b is selected on the basis of the second signal, the second wireless power reception device 202b may identify the information associated with the first wireless power reception device 202a included in the second signal in operation 915. For example, the second wireless power reception device 202b may identify information about a user registered in the first wireless power reception device 202a, which is included in the second signal, and may identify whether the first wireless power reception device 202a is owned by the same user. When it is identified that the first wireless power reception device 202a is not owned by the same user, the second wireless power reception device 202b may perform operation 926. When it is identified that the first wireless power reception device 202a is owned by the same user, the second wireless power reception device 202b may perform operation 625 of FIG. 6.

In operation 916, the first wireless power reception device 202a may display device state information on the display (e.g., the display device 160 of FIG. 1 or the display 226 of FIG. 2) in a secure mode. For example, in the secure mode, it is possible to display device state information and to prevent a display of an external message.

In operation 926, the second wireless power reception device 202b may display device state information on the display (e.g., the display device 160 of FIG. 1 or the display 226 of FIG. 2) in the secure mode. For example, in the secure mode, it is possible to display device state information and to prevent a display of an external message.

In operation 917 and operation 927, the first wireless power reception device 202a and the second wireless power reception device 202b may identify whether the reception of the charging power is released. When it is identified that the reception of the charging power is not released, the first wireless power reception device 202a and the second wireless power reception device 202b may maintain the display of the device state information in the security mode. When it is identified that the reception of the charging power is released, the first wireless power reception device 202a and the second wireless power reception device 202b may perform operation 918 and operation 928, respectively.

In operation 918 and operation 928, the first wireless power reception device 202a and the second wireless power reception device 202b may release the secure mode when the reception of the charging power is released.

Figure 10:
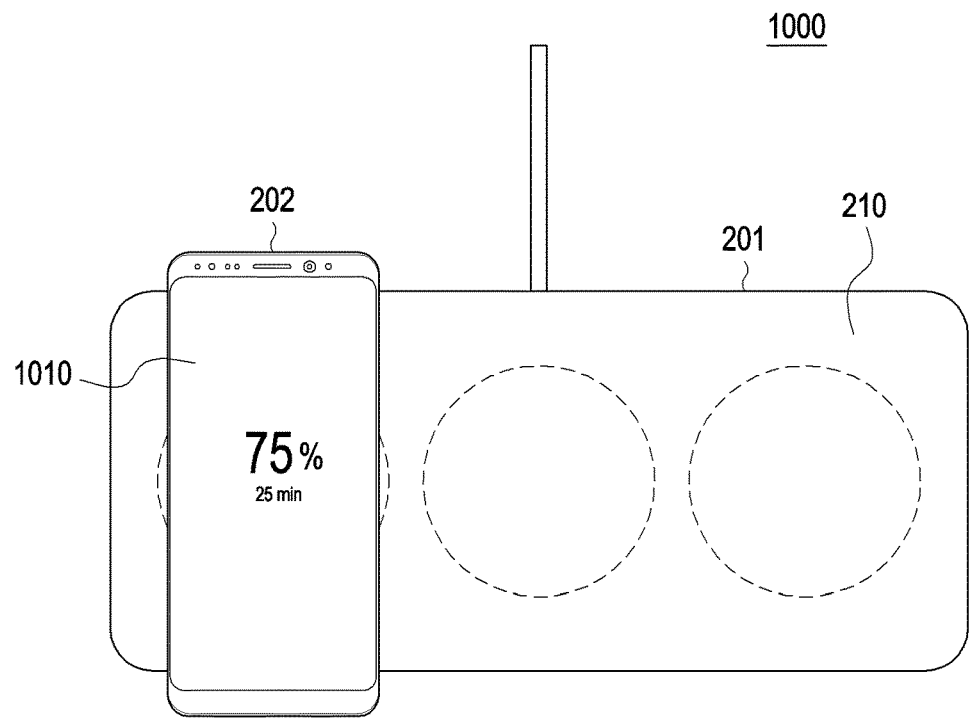
FIG. 10 illustrates a method of displaying device state information on a wireless power reception device wirelessly charged by a wireless power transmission device according to certain embodiments.
Figure 11:
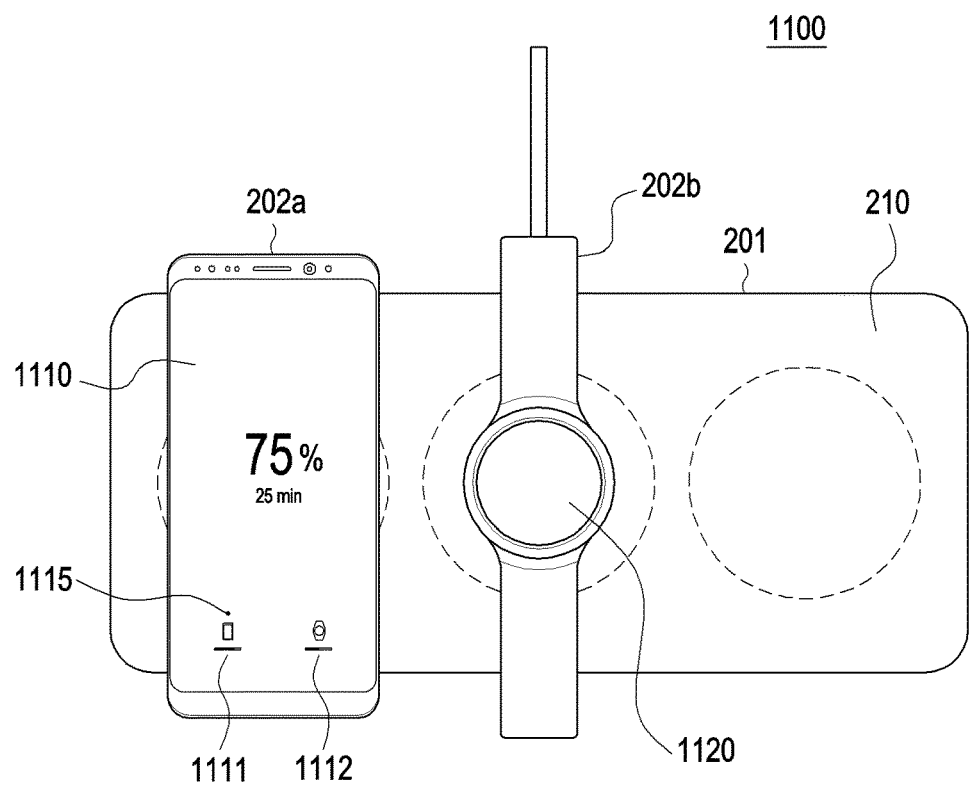
FIG. 11 illustrates a method of displaying device state information on a wireless power reception device wirelessly charged by a wireless power transmission device according to certain embodiments.
Figure 12:
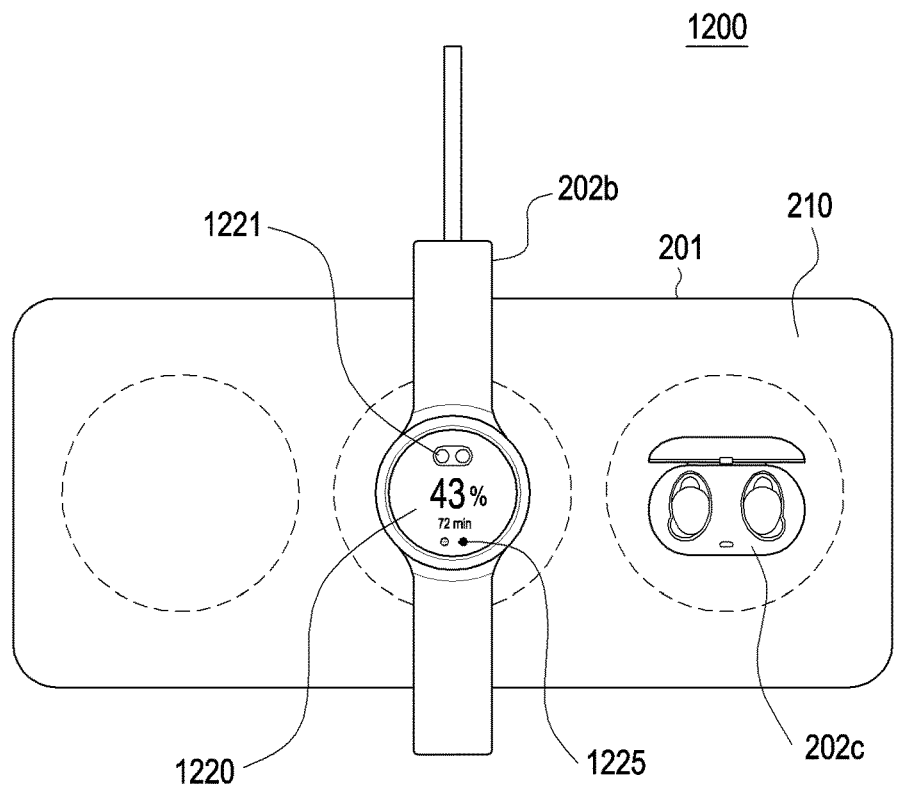
FIG. 12 illustrates a method of displaying device state information on a wireless power reception device wirelessly charged by a wireless power transmission device according to certain embodiments.

FIG. 10 is a diagram 1000 illustrating a method of displaying device state information on a wireless power reception device wirelessly charged by a wireless power transmission device according to certain embodiments, FIG. 11 is a diagram 1100 illustrating a method of displaying device state information on a wireless power reception device wirelessly charged by a wireless power transmission device according to certain embodiments, and FIG. 12 is a diagram 1200 illustrating a method of displaying device state information on a wireless power reception device wirelessly charged by a wireless power transmission device according to certain embodiments.

Referring to FIG. 10, when a wireless power reception device 202 (e.g., a smartphone) is placed on a pad (e.g., the housing 210 of FIG. 3) in which a plurality of coils (e.g., a first coil 218L-1, a second coil 218L-2, and a third coil 218L-3 of FIG. 3) is installed, a wireless power transmission device 201 (e.g., a wireless charging pad) may transmit charging power to the wireless power reception device 202. The wireless power reception device 202 may display a user interface 1010 to display charging state information thereof, for example, the percent battery charge, and the time remaining.

Referring to FIG. 11, when a first wireless power reception device 202a (e.g., a smartphone) is placed on a pad (e.g., the housing 210 of FIG. 3) in which a plurality of coils (e.g., a first coil 218L-1, a second coil 218L-2, and a third coil 218L-3 of FIG. 3) is installed and a second wireless power reception device 202b (e.g., a smartwatch) is also placed thereon, a wireless power transmission device 201 (e.g., a wireless charging pad) may transmit charging power to the first wireless power reception device 202a and the second wireless power reception device 202b. The wireless power transmission device 201 may transmit a signal for requesting device-related information to the first wireless power reception device 202a and the second wireless power reception device 202b and may select one wireless power reception device to display charging state information from among the first wireless power reception device 202a and the second wireless power reception device 202b on the basis of a response signal in response to the signal. For example, the wireless power transmission device 201 may identify that a display is included both in the first wireless power reception device 202a and in the second wireless power reception device 202b on the basis of the response signal, may compare the sizes of the identified two displays, may instruct the first wireless power reception device 202a having a relatively larger screen to display the charging state information, may receive information for displaying charging state information from the second wireless power reception device 202b, and may transmit the information to the first wireless power reception device 202a.

According to certain embodiments, when the first wireless power reception device 202a is selected as a device to display a charging state, the first wireless power reception device 202a may display a user interface 1110 to display charging state information about the first wireless power reception device 202a and the second wireless power reception device 202b on the display. In addition, the second wireless power reception device 202b may deactivate 1120 the display. For example, the user interface 1110 may include a mini-size state information area 1111 for the first wireless power reception device 202a and a mini-size state information area 1112 for the second wireless power reception device 202b, and each of the mini-size state information areas 1111 and 1112 may display an indication 1115 indicating a wireless power reception device displayed in a main area.

Referring to FIG. 12, when a second wireless power reception device 202b (e.g., a smartwatch) is placed on a pad (e.g., the housing 210 of FIG. 3) in which a plurality of coils (e.g., a first coil 218L-1, a second coil 218L-2, and a third coil 218L-3 of FIG. 3) is installed and a third wireless power reception device 202c (e.g., hearables) is also placed thereon, a wireless power transmission device 201 (e.g., a wireless charging pad) may transmit charging power to the second wireless power reception device 202b and the third wireless power reception device 202c. The wireless power transmission device 201 may transmit a signal for requesting device-related information to the second wireless power reception device 202b and the third wireless power reception device 202c and may select one wireless power reception device to display charging state information from among the second wireless power reception device 202b and the third wireless power reception device 202c on the basis of a response signal in response to the signal. For example, the wireless power transmission device 201 may identify that a display is included only in the second wireless power reception device 202b among the second wireless power reception device 202b and the third wireless power reception device 202c on the basis of the response signal, may instruct the second wireless power reception device 202b having the display to display the charging state information, may receive information for displaying charging state information from the third wireless power reception device 202c, and may transmit the information to the second wireless power reception device 202b.

According to certain embodiments, when the second wireless power reception device 202b is selected as a device to display a charging state, the second wireless power reception device 202b may display a user interface 1220 to display charging state information about the second wireless power reception device 202b and the third wireless power reception device 202c on the display. For example, the user interface 1220 may display an icon 1221 indicating a wireless power reception device corresponding to charging state information displayed in a main area and may display an indication 1225 indicating a switch of charging state information to be displayed in the main area.

Figure 13:
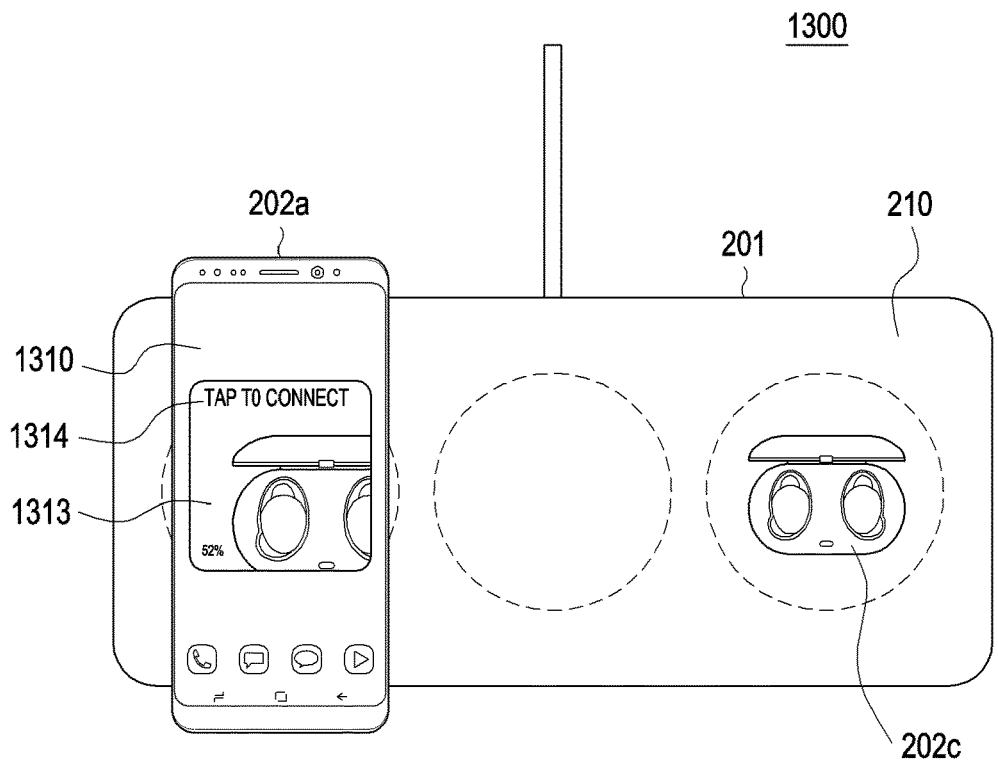
FIG. 13 illustrates a method of displaying information for performing a setup procedure on a plurality of wireless power reception devices by a wireless power transmission device in according to certain embodiments.

FIG. 13 is a diagram 1300 illustrating a method of displaying information for performing a setup procedure on a plurality of wireless power reception devices by a wireless power transmission device according to certain embodiments.

Referring to FIG. 13, when wireless power reception device 202c (e.g., hearables) is placed on a pad (e.g., the housing 210 of FIG. 3) in which a plurality of coils (e.g., a first coil 218L-1, a second coil 218L-2, and a third coil 218L-3 of FIG. 3) is installed while charging power is being transmitted to a first wireless power reception device 202a (e.g., a smartphone) on the pad, a wireless power transmission device 201 (e.g., a wireless charging pad) may transmit charging power to the third wireless power reception device 202c. The wireless power transmission device 201 may transmit a signal for requesting device-related information to the first wireless power reception device 202a and the wireless power reception device 202c and may identify that a pairing connection between the first wireless power reception device 202a and the wireless power reception device 202c is required on the basis of a response signal in response to the signal. In this case, the wireless power transmission device 201 may instruct the first wireless power reception device 202a having a display, among the first wireless power reception device 202a and the wireless power reception device 202c, to display configuration information for a pairing connection on the basis of the response signal.

According to certain embodiments, when the first wireless power reception device 202a is selected as a device to display the configuration information for the pairing connection, the first wireless power reception device 202a may display a user interface 1310 to display the configuration information for the pairing connection on the display. For example, the user interface 1310 may display an area 1313 for displaying information for a pairing connection and an indication area 1314 for identifying a user instruction for a pairing connection.

Figure 14A:
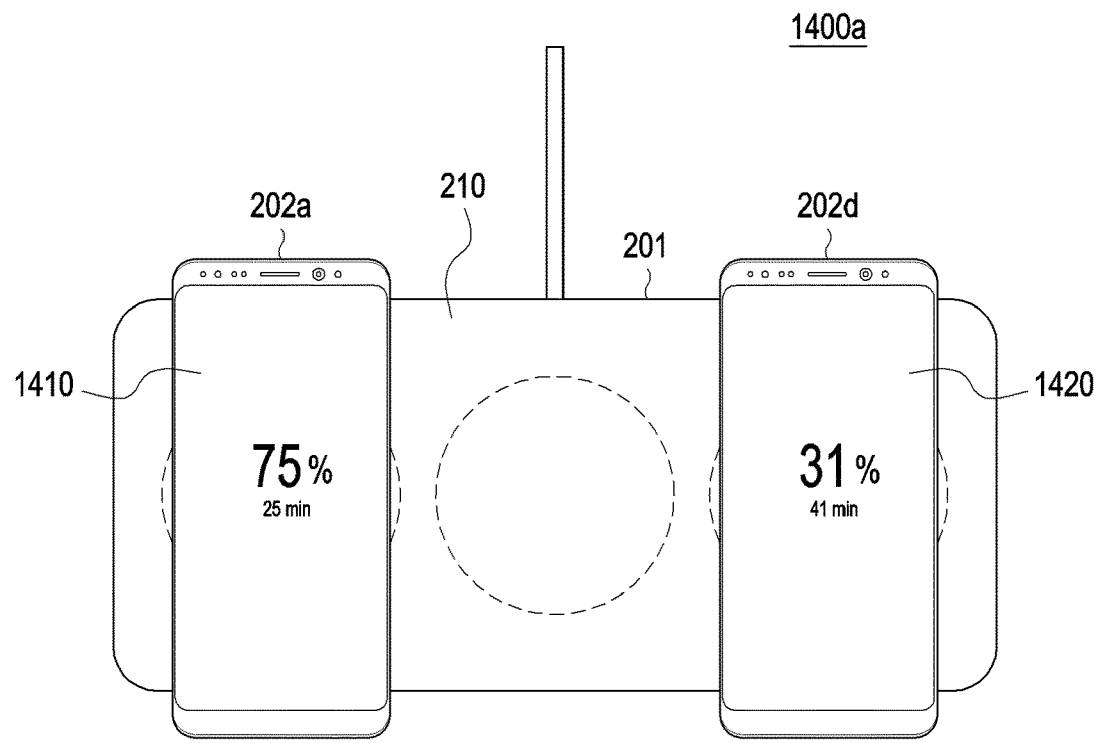
FIG. 14A illustrates a method of displaying device state information in a secure mode on a wireless power reception device wirelessly charged by a wireless power transmission device according to certain embodiments.
Figure 14B:
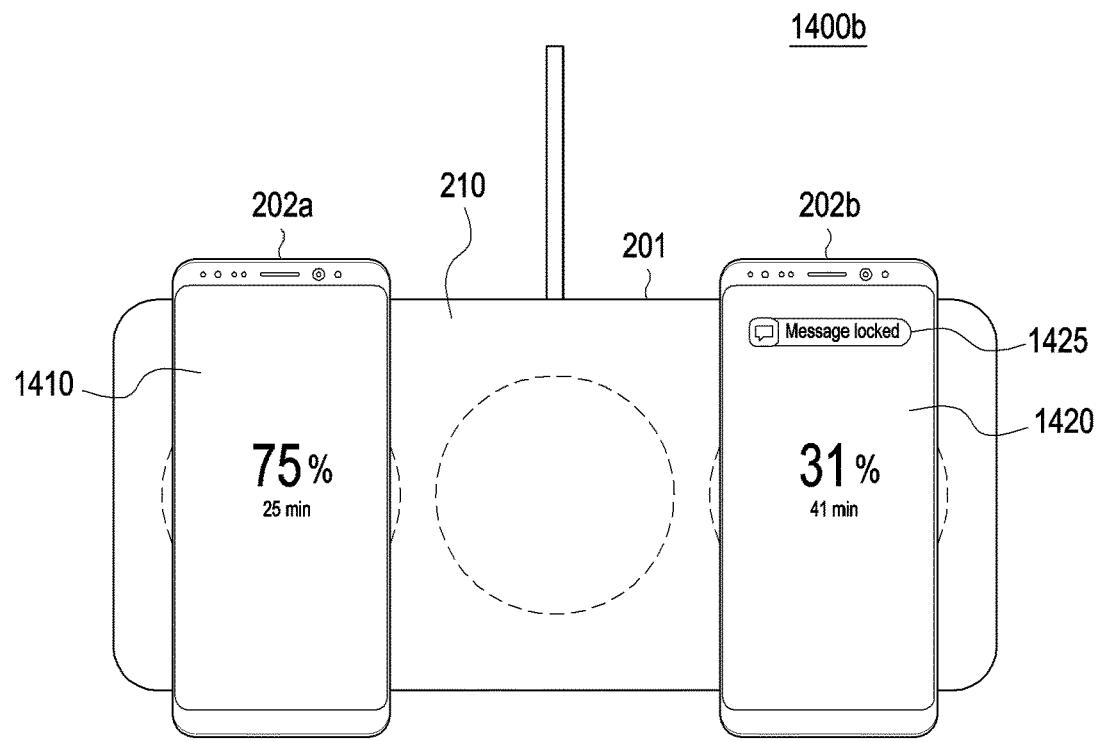
FIG. 14B illustrates a method of displaying device state information in a secure mode on a wireless power reception device wirelessly charged by a wireless power transmission device according to certain embodiments.

FIG. 14A is a diagram 1400a illustrating a method of displaying device state information in a secure mode on a wireless power reception device wirelessly charged by a wireless power transmission device according to certain embodiments, and FIG. 14B is a diagram 1400b illustrating a method of displaying device state information in a secure mode on a wireless power reception device wirelessly charged by a wireless power transmission device according to certain embodiments.

Referring to FIG. 14A and FIG. 14B, when a first wireless power reception device 202a (e.g., a smartphone) is placed on a pad (e.g., the housing 210 of FIG. 3) in which a plurality of coils (e.g., a first coil 218L-1, a second coil 218L-2, and a third coil 218L-3 of FIG. 3) is installed and a wireless power reception device 202d (e.g., a smartphone) is also placed thereon, a wireless power transmission device 201 (e.g., a wireless charging pad) may transmit charging power to the first wireless power reception device 202a and the wireless power reception device 202d. The wireless power transmission device 201 may transmit a signal for requesting device-related information to the first wireless power reception device 202a and the wireless power reception device 202d and may identify that the user of the first wireless power reception device 202a is different from the user of the wireless power reception device 202d on the basis of a response signal in response to the signal. In this case, the wireless power transmission device 201 may instruct the respective reception devices to display charging state information on individual displays thereof. Accordingly, the first wireless power reception device 202a may display a user interface 1410 to display charging state information thereof, and the wireless power reception device 202d may display a user interface 1420 to display charging state information thereof.

According to certain embodiments, when the wireless power reception devices 202a and 202d of the different users are charged on the wireless power transmission device 201, the wireless power transmission device 201 may instruct to the first wireless power reception device 202a and the wireless power reception device 202d to operate in the secure mode. In this case, as shown in FIG. 14B, when the wireless power reception device 202d receives an external message, an indication area 1425 may display the message that the device is locked.

An electronic device (e.g., the electronic device 102 of FIG. 1, the wireless power transmission device 201 of FIG. 2, or the wireless charging pad 201 of FIG. 3) according to certain embodiments may include: a plurality of coils (e.g., the transmission coil 218L of FIG. 2 or the first coil 218L-1, the second coil 218L-2, and the third coil 218L-3 of FIG. 3) configured to transmit charging power; a communication circuit (e.g., the communication module 190 of FIG. 1 or the communication circuit 219 of FIG. 2); a processor (e.g., the processor 120 of FIG. 1 or the processor 211 of FIG. 2); and a memory (e.g., the memory 130 of FIG. 1 or the memory 213 of FIG. 2), wherein the memory may store instructions configured to, when executed, enable the processor to:

transmit a first signal for requesting device-related information to a plurality of external electronic devices (e.g., the electronic device 101 of FIG. 1 or the wireless power reception device 202 of FIG. 2) through the communication circuit; receive first response signals in response to the first signal from the plurality of external electronic devices through the communication circuit; select at least one external electronic device from among the plurality of external electronic devices on the basis of the first response signals; and transmit a second signal that indicates the at least one selected external electronic device and includes at least information associated with the plurality of external electronic devices to the plurality of external electronic devices via the communication circuit upon selecting the at least one selected external electronic device.

In the electronic device 201 according to certain embodiments, the device-related information may include device identification information or device state information, the device identification information may include at least one of a device type, a device name, or an MAC address, and the device state information may include at least one of a display characteristic, a battery characteristic, a charging state, or a user configuration.

In the electronic device 201 according to certain embodiments, the communication circuit may be configured to provide at least one of Bluetooth Low Energy (BLE) communication, wireless charging protocol communication, Bluetooth (BT) communication, Wi-Fi communication, or Near-Field Communication (NFC).

In the electronic device 201 according to certain embodiments, the instructions may be configured to enable the processor to transmit the first signal and the second signal in a broadcasting manner.

In the electronic device 201 according to certain embodiments, the instructions may be configured to enable the processor to: transmit the first signal upon transmitting charging power to a new external electronic device while transmitting charging power to at least one external electronic device through the plurality of coils; or transmit the first signal according to a preset period while transmitting charging power to the plurality of external electronic devices through the plurality of coils.

In the electronic device 201 according to certain embodiments, the instructions may be configured to enable the processor to: identify the number of the plurality of external electronic devices upon transmitting charging power to the plurality of external electronic devices; and select the at least one external electronic device from among the plurality of external electronic devices on the basis of information included in a plurality of received first response signals upon receiving as many first response signals, in response to the transmitted first signal, as the identified number; or select the at least one external electronic device from among the plurality of external electronic devices on the basis of information included in at least one first response signal received for a preset time from transmission of the first signal.

In the electronic device 201 according to certain embodiments, the instructions may be configured to enable the processor to select the at least one external electronic device from among the plurality of external electronic devices on the basis of information included in the received first response signals, on the basis of the information included in the received first response signals and information previously stored in the memory, or on the basis of the information included in the received first response signals and information obtained in relation to power transmission through the plurality of coils.

In the electronic device 201 according to certain embodiments, the instructions may be configured to enable the processor to: transmit the second signal upon selecting the at least one external electronic device from among the plurality of external electronic devices; transmit the second signal upon selecting a new external electronic device with the at least one external electronic device selected; or transmit the second signal according to a preset period while maintaining the least one selected external electronic device.

In the electronic device 201 according to certain embodiments, the second signal may include an indication to perform a designated operation on the basis of selection of the at least one external device.

In the electronic device 201 according to certain embodiments, the indication to perform the designated operation may include at least one of an indication of instructing the at least one selected external electronic device to display device state information, an indication that the at least one selected external electronic device is capable of displaying the device state information, an indication about a priority of the at least one selected external electronic device in displaying the device state information, an indication of instructing the at least one selected external electronic device to perform an operation associated with a device configuration, an indication of instructing the at least one selected external electronic device to perform an operation associated with registered user information, or an indication of instructing the plurality of external electronic devices to perform an operation associated with a display of the device state information on the basis of the information included in the second signal.

In the electronic device 201 according to certain embodiments, the instructions may be configured to enable the processor to: receive information associated with a designated operation from at least one unselected external electronic device among the plurality of external electronic devices through the communication circuit in response to the second signal; and transmit the information associated with the designated operation to the at least one selected external electronic device upon receiving the information.

In the electronic device 201 according to certain embodiments, the instructions may be configured to enable the processor to: receive a second response signal for requesting the information associated with the designated operation from the at least one selected external electronic device through the communication circuit in response to the second signal; and transmit the information associated with the designated operation to the at least one selected external electronic device upon receiving the second response signal.

In the electronic device 201 according to certain embodiments, the instructions may be configured to enable the processor to: establish a communication connection with at least one external electronic device responding to the first signal through the communication circuit; and communicate a signal or information using the communication connection.

An electronic device (e.g., the electronic device 101 of FIG. 1 or the wireless power reception device 202 of FIG. 2) according to certain embodiments may include: at least one coil (e.g., the reception coil 228L of FIG. 2) configured to receive charging power; a communication circuit (e.g., the communication module 190 of FIG. 1 or the communication circuit 229 of FIG. 2); a processor (e.g., the processor 120 of FIG. 1 or the processor 221 of FIG. 2); and a memory (e.g., the memory 130 of FIG. 1 or the memory 223 of FIG. 2), wherein the memory may store instructions configured to, when executed, enable the processor to: transmit a first response signal in response to a first signal to a first external electronic device (e.g., the electronic device 102 of FIG. 1, the wireless power transmission device 201 of FIG. 2, or the wireless charging pad 201 of FIG. 3) upon receiving the first signal for requesting device-related information from the first external electronic device including a plurality of coils through the communication circuit; receive a second signal that indicates at least one second external electronic device selected from among a plurality of second external electronic devices and includes at least information associated with the plurality of external electronic devices from the first external electronic device through the communication circuit; and perform a designated operation on the basis of the received second signal.

In the electronic device 202 according to certain embodiments, the instructions may be configured to enable the processor to transmit the first response signal to the first external electronic device upon receiving the first signal when receiving charging power from the first external electronic device through the at least one coil.

In the electronic device 202 according to certain embodiments, the second signal may include an indication to perform a designated operation on the basis of selection of the at least one second external device.

In the electronic device 202 according to certain embodiments, the instructions may be configured to enable the processor to transmit a second response signal for requesting information associated with the designated operation on the basis of the information associated with the plurality of external electronic devices included in the second signal upon identifying that the electronic device is selected on the basis of the second signal.

In the electronic device 202 according to certain embodiments, the instructions may be configured to enable the processor to transmit information associated with the designated operation on the basis of the information associated with the plurality of external electronic devices included in the second signal upon identifying that the electronic device is not selected on the basis of the second signal.

In the electronic device 202 according to certain embodiments, the instructions may be configured to enable the processor to: establish a communication connection with the first external electronic device through the communication circuit upon receiving the first signal; and communicate a signal or information using the communication connection.

A storage medium according to certain embodiments may non-transitorily store instructions, and the instructions may be configured to enable at least one circuit to perform at least one operation when executed by the at least one circuit, the at least one operation including: transmitting a first signal for requesting device-related information to a plurality of external electronic devices; receiving first response signals in response to the first signal from the plurality of external electronic devices; selecting at least one external electronic device from among the plurality of external electronic devices on the basis of the first response signals; and transmitting a second signal that indicates the at least one selected external electronic device and includes at least information associated with the plurality of external electronic devices to the plurality of external electronic devices upon selecting the at least one selected external electronic device.

An electronic device according to certain embodiments disclosed herein may be various types of devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd", or "first" and "second" may be used to simply distinguish a corresponding component from another, and does not limit the components in other aspects (e.g., importance or order). It is to be understood that if an element (e.g., a first element) is referred to, with or without the term "operatively" or "communicatively," as "coupled with," or "connected with," it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the invoked at least one instruction. The one or more instructions may include a code generated by a compiler or a code executable by an interpreter. The machine-readable storage media may be provided in the form of non-transitory storage media. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more components of the above-described components or operations may be omitted, or one or more other components or operations may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a plurality of coils configured to transmit charging power;
a communication circuit;
at least one processor; and
at least one memory, wherein the at least one memory stores instructions that, when executed by the at least one processor, causes the at least one processor to perform a plurality of operations comprising:
transmitting a first signal for requesting device-related information to a plurality of external electronic devices through the communication circuit,
receiving a corresponding plurality of first response signals in response to the first signal from the plurality of external electronic devices through the communication circuit,
selecting at least one external electronic device from among the plurality of external electronic devices on the basis of the plurality of first response signals, and
upon selecting the at least one selected external electronic device, transmitting a second signal that indicates the at least one selected external electronic device and comprises at least information associated with the plurality of external electronic devices to the plurality of external electronic devices via the communication circuit.

2. The electronic device of claim 1, wherein the device-related information comprises device identification information or device state information,
the device identification information comprises at least one of a device type, a device name, or an MAC address, and
the device state information comprises at least one of a display characteristic, a battery characteristic, a charging state, or a user configuration.

3. The electronic device of claim 1, wherein the plurality of operations further comprise providing at least one of Bluetooth Low Energy (BLE) communication, wireless charging protocol communication, Bluetooth (BT) communication, Wi-Fi communication, or Near-Field Communication (NFC).

4. The electronic device of claim 1, wherein the plurality of operations further comprise transmitting the first signal and the second signal in a broadcasting manner.

5. The electronic device of claim 1, wherein the plurality of operations further comprise:
transmitting the first signal upon transmitting charging power to a new external electronic device while transmitting charging power to at least one external electronic device through the plurality of coils, or
transmitting the first signal according to a preset period while transmitting charging power to the plurality of external electronic devices through the plurality of coils.

6. The electronic device of claim 1, wherein the plurality of operations further comprise:
identifying a number of the plurality of external electronic devices upon transmitting charging power to the plurality of external electronic devices, and
when the number of first response signals corresponding to the identified number is receive, selecting the at least one external electronic device from among the plurality of external electronic devices on the basis of information comprised in a plurality of received first response signals, or
selecting the at least one external electronic device from among the plurality of external electronic devices on the basis of information comprised in at least one first response signal received during a preset time from transmission of the first signal.

7. The electronic device of claim 1, wherein the plurality of operations further comprise selecting the at least one external electronic device from among the plurality of external electronic devices on the basis of information comprised in the plurality of received first response signals, on the basis of the information comprised in the plurality of received first response signals and information previously stored in the memory, or on the basis of the information comprised in the plurality of received first response signals and information obtained in relation to power transmission through the plurality of coils.

8. The electronic device of claim 1, wherein the plurality of operations further comprise:
transmitting the second signal upon selecting the at least one external electronic device from among the plurality of external electronic devices,
transmitting the second signal upon selecting a new external electronic device with the at least one external electronic device selected, or
transmitting the second signal according to a preset period while maintaining the least one selected external electronic device.

9. The electronic device of claim 1, wherein the second signal comprises an indication to perform a designated operation on the basis of selection of the at least one external device.

10. The electronic device of claim 9, wherein the indication to perform the designated operation comprises at least one of an indication of instructing the at least one selected external electronic device to display device state information, an indication that the at least one selected external electronic device is capable of displaying the device state information, an indication about a priority of the at least one selected external electronic device in displaying the device state information, an indication of instructing the at least one selected external electronic device to perform an operation associated with a device configuration, an indication of instructing the at least one selected external electronic device to perform an operation associated with registered user information, or an indication of instructing the plurality of external electronic devices to perform an operation associated with a display of the device state information on the basis of the information comprised in the second signal.

11. The electronic device of claim 1, wherein plurality of operations further comprise:
receiving information associated with a designated operation from at least one unselected external electronic device among the plurality of external electronic devices through the communication circuit in response to the second signal, and
transmitting the information associated with the designated operation to the at least one selected external electronic device upon receiving the information.

12. The electronic device of claim 11, wherein the plurality of operations further comprise:
receiving a second response signal for requesting the information associated with the designated operation from the at least one selected external electronic device through the communication circuit in response to the second signal, and
transmitting the information associated with the designated operation to the at least one selected external electronic device upon receiving the second response signal.

13. The electronic device of claim 1, wherein the plurality of operations further comprise:
establishing a communication connection with at least one external electronic device responding to the first signal through the communication circuit, and
communicating information using the communication connection.

14. An electronic device comprising:
at least one coil configured to receive charging power;
a communication circuit;
at least one processor; and
at least one memory, wherein the at least one memory stores instructions that, when executed by the at least one processor, causes the at least one processor to perform a plurality of operations comprising:
transmitting a first response signal in response to a first signal to a first external electronic device upon receiving the first signal for requesting device-related information from the first external electronic device comprising a plurality of coils through the communication circuit,
receiving a second signal that indicates at least one second external electronic device selected from among a plurality of second external electronic devices and comprises at least information associated with the plurality of external electronic devices from the first external electronic device through the communication circuit, and
performing a designated operation on the basis of the received second signal.

15. The electronic device of claim 14, wherein the plurality of operations further comprise transmitting the first response signal to the first external electronic device upon receiving the first signal when receiving charging power from the first external electronic device through the at least one coil.

16. The electronic device of claim 14, wherein the second signal comprises an indication to perform a designated operation on the basis of selection of the at least one second external device.

17. The electronic device of claim 14, wherein the plurality of operations further comprise transmitting a second response signal for requesting information associated with the designated operation on the basis of the information associated with the plurality of external electronic devices comprised in the second signal upon identifying that the electronic device is selected on the basis of the second signal.

18. The electronic device of claim 14, wherein the plurality of operations further comprise transmitting information associated with the designated operation on the basis of the information associated with the plurality of external electronic devices comprised in the second signal upon identifying that the electronic device is not selected on the basis of the second signal.

19. The electronic device of claim 14, wherein the plurality of operations further comprise:
establishing a communication connection with the first external electronic device through the communication circuit upon receiving the first signal, and
communicating information using the communication connection.

20. A non-transitory storage medium that stores instructions, the instructions being configured to enable at least one circuit to perform at least one operation when executed by the at least one circuit, the at least one operation comprising:
transmitting a first signal for requesting device-related information to a plurality of external electronic devices,
receiving a corresponding a plurality of first response signals in response to the first signal from the plurality of external electronic devices,
selecting at least one external electronic device from among the plurality of external electronic devices on the basis of the plurality of first response signals, and
upon selecting the at least one selected external electronic device, transmitting a second signal that indicates the at least one selected external electronic device and comprises at least information associated with the plurality of external electronic devices to the plurality of external electronic devices.

* * * * *